(12) United States Patent
Matsubara et al.

(10) Patent No.: US 10,114,364 B2
(45) Date of Patent: Oct. 30, 2018

(54) NUMERICAL-CONTROL-PROGRAM EDITING APPARATUS, NUMERICAL-CONTROL-PROGRAM EDITING METHOD, AND PROGRAM

(71) Applicant: Mitsubishi Electric Corporation, Chiyoda-ku, Tokyo (JP)

(72) Inventors: Susumu Matsubara, Tokyo (JP); Kenji Iriguchi, Tokyo (JP); Tomonori Sato, Tokyo (JP); Nobuyuki Takahashi, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 343 days.

(21) Appl. No.: 14/768,314

(22) PCT Filed: Apr. 12, 2013

(86) PCT No.: PCT/JP2013/061127
§ 371 (c)(1),
(2) Date: Aug. 17, 2015

(87) PCT Pub. No.: WO2014/167736
PCT Pub. Date: Oct. 16, 2014

(65) Prior Publication Data
US 2016/0011583 A1    Jan. 14, 2016

(51) Int. Cl.
*G05B 19/4093* (2006.01)
(52) U.S. Cl.
CPC ... *G05B 19/4093* (2013.01); *G05B 19/40937* (2013.01); *G05B 2219/34291* (2013.01); *G05B 2219/36246* (2013.01); *Y02P 90/265* (2015.11)
(58) Field of Classification Search
CPC ............ G05B 19/4093; G05B 19/4097; G05B 2219/34291; Y02P 90/265
See application file for complete search history.

(56) References Cited

U.S. PATENT DOCUMENTS

| | | |
|---|---|---|
| 5,799,530 A | 9/1998 | Nagasawa |
| 6,038,899 A | 3/2000 | Nagasawa |

(Continued)

FOREIGN PATENT DOCUMENTS

| | | |
|---|---|---|
| CN | 101743547 A | 6/2010 |
| JP | 01-307805 A | 12/1989 |

(Continued)

OTHER PUBLICATIONS

Communication dated Dec. 1, 2016 from the State Intellectual Property Office of the P.R.C. in counterpart Application No. 201380075448.3.

(Continued)

*Primary Examiner* — Charles Kasenge
(74) *Attorney, Agent, or Firm* — Sughrue Mion, PLLC; Richard C. Turner

(57) ABSTRACT

A NC-program editing apparatus includes a 3D-machining-shape generating unit that generates, for each unit of machining, a three-dimensional machining shape including position information in a three-dimensional virtual space on the basis of attribute information described for each unit of machining configuring an NC program, an attribute processing unit that extracts the attribute information from the NC program and associates three-dimensional position information corresponding to a machining shape corresponding to the extracted attribute information with the extracted attribute information, and a display-screen control unit that displays the NC program on a program display screen and displays a projection drawing of the machining shape on a shape display screen according to position information contained in the machining shape and, when receiving an input for editing the NC program via the program display screen, reflects content of the input on the NC program.

12 Claims, 38 Drawing Sheets

(56) References Cited

U.S. PATENT DOCUMENTS

| | | | |
|---|---|---|---|
| 6,227,022 B1 | 5/2001 | Nagasawa | |
| 6,256,595 B1 | 7/2001 | Schwalb et al. | |
| 7,058,472 B2* | 6/2006 | Mathews | G05B 19/4097 700/103 |
| 7,127,324 B2* | 10/2006 | Batori | G06T 19/00 345/420 |
| 7,248,941 B2* | 7/2007 | Kamiya | G05B 19/4093 700/160 |
| 7,457,684 B2* | 11/2008 | Kamiya | G05B 19/4093 700/159 |
| 7,487,006 B2* | 2/2009 | Kamiya | G05B 19/4093 700/160 |
| 7,577,492 B2* | 8/2009 | Kamiya | G05B 19/4093 700/182 |
| 7,620,473 B2* | 11/2009 | Kamiya | G05B 19/4093 700/160 |
| 8,374,718 B2* | 2/2013 | Takahashi | G05B 19/4069 318/568.15 |
| 8,723,862 B2* | 5/2014 | Mitani | G05B 19/4097 345/419 |
| 9,268,322 B2* | 2/2016 | Matsubara | G05B 19/4093 |
| 9,489,339 B2* | 11/2016 | Mackman | G06F 17/00 |
| 9,523,966 B2* | 12/2016 | Matsubara | G05B 19/40931 |
| 9,547,301 B2* | 1/2017 | Seya | G05B 19/4063 |
| 9,581,992 B2* | 2/2017 | Nakano | G05B 19/4097 |
| 2001/0004840 A1 | 6/2001 | Nagasaw | |
| 2001/0018644 A1 | 8/2001 | Schwalb et al. | |
| 2001/0049953 A1 | 12/2001 | Nagasawa | |
| 2002/0118187 A1* | 8/2002 | Batori | G06T 19/00 345/419 |
| 2002/0118229 A1* | 8/2002 | Batori | G06T 19/00 715/771 |
| 2002/0149625 A1* | 10/2002 | Shimizu | G06T 19/00 715/771 |
| 2003/0125827 A1* | 7/2003 | Arai | G05B 19/408 700/180 |
| 2003/0192867 A1 | 10/2003 | Yamazaki et al. | |
| 2003/0228560 A1* | 12/2003 | Seat | G09B 19/00 434/219 |
| 2004/0143362 A1* | 7/2004 | Matthews | G05B 19/4097 700/182 |
| 2005/0246050 A1 | 11/2005 | Serizawa | |
| 2006/0058908 A1 | 3/2006 | Kamiya et al. | |
| 2006/0247804 A1 | 11/2006 | Kamiya et al. | |
| 2006/0259181 A1 | 11/2006 | Kamiya et al. | |
| 2007/0027571 A1 | 2/2007 | Kamiya et al. | |
| 2007/0185607 A1 | 8/2007 | Kamiya et al. | |
| 2010/0182312 A1 | 7/2010 | Mitani et al. | |
| 2011/0035044 A1* | 2/2011 | Takahashi | G05B 19/4069 700/178 |
| 2014/0025192 A1* | 1/2014 | Seya | G05B 19/4063 700/174 |

FOREIGN PATENT DOCUMENTS

| | | |
|---|---|---|
| JP | 03-201010 A | 9/1991 |
| JP | 04-307605 A | 10/1992 |
| JP | 10-180358 A | 7/1998 |
| JP | 2001-60108 A | 3/2001 |
| JP | 2003-029810 A | 1/2003 |
| JP | 2003-308104 A | 10/2003 |
| JP | 2004-046748 A | 2/2004 |
| JP | 2005-044348 A | 2/2005 |
| JP | 2005-309713 A | 11/2005 |
| JP | 2006-085306 A | 3/2006 |
| JP | 2008-030070 A | 2/2008 |
| JP | 4430149 B2 | 3/2010 |
| JP | 2010-198109 A | 9/2010 |
| JP | 2012-198887 A | 10/2012 |
| WO | 2005/002792 A1 | 1/2005 |
| WO | 2009/008072 A1 | 1/2009 |

OTHER PUBLICATIONS

International Search Report for PCT/JP2013/061127 dated Jun. 25, 2013 [PCT/ISA/210].
Written Opinion for PCT/JP2013/061127 dated Jun. 25, 2013 [PCT/ISA/237].
Communication dated May 25, 2017, from the State Intellectual Property Office of People's Republic of China in counterpart Application No. 201380075448.3.

* cited by examiner

FIG.3

| UNIT NUMBER | MACHINING UNIT | MATERIAL QUALITY | MATERIAL OUTER DIAMETER | MATERIAL INNER DIAMETER | MATERIAL LENGTH | MATERIAL END FACE LENGTH | ROTATING SPEED |
|---|---|---|---|---|---|---|---|
| 0 | MATERIAL | S45C | 105 | 25 | 70 | 5 | 2500 |
| UNIT NUMBER | MACHINING UNIT | X | Y | θ | Z | C | |
| 1 | BASIC COORDINATE | 0 | 0 | 0 | 0 | 0 | |
| UNIT NUMBER | MACHINING UNIT | ANGLE B | ANGLE C | | | | |
| 2 | MACHINING SURFACE ANGLE | 0 | 0 | | | | |
| UNIT NUMBER | MACHINING UNIT | MACHINING SECTION | INCISION -X | INCISION -Z | | | |
| 3 | END FACE MACHINING | FRONT | 105 | -5 | | | |
| TOOL NUMBER | TOOL | CALL | CIRCUMFERENTIAL SPEED | FEED | | | |
| 1 | TURNING TOOL | 10 | 1000 | 0.1 | | | |
| SHAPE NUMBER | SHAPE | START POINT -X | START POINT -Z | END POINT -X | END POINT -Z | | |
| 1 | LINE | 25 | -5 | 25 | 0 | | |
| UNIT NUMBER | MACHINING UNIT | MACHINING SECTION | INCISION -X | INCISION -Z | | | |
| 4 | TURNING | OUTER DIAMETER OPEN | 105 | 0 | | | |
| TOOL NUMBER | TOOL | CALL | CIRCUMFERENTIAL SPEED | FEED | | | |
| 1 | TURNING TOOL | 10 | 1000 | 0.1 | | | |
| SHAPE NUMBER | SHAPE | START POINT -X | START POINT -Z | END POINT -X | END POINT Z | RADIUS R | |
| 1 | CONCAVE ARC | 55 | 0 | 75 | 15 | 20 | |
| 2 | LINE | 75 | 15 | 75 | 35 | | |
| 3 | LINE | 75 | 35 | 100 | 50 | | |
| UNIT NUMBER | MACHINING UNIT | ANGLE B | ANGLE C | | | | |
| 5 | MACHINING SURFACE ANGLE | 45 | 0 | | | | |
| UNIT NUMBER | MACHINING UNIT | MOVEMENT X | MOVEMENT Y | MOVEMENT Z | MOVEMENT C | ROTATION θ | |
| 6 | BASIC COORDINATE MOVEMENT | 50 | 0 | -25 | 0 | 0 | |
| UNIT NUMBER | MACHINING UNIT | DEPTH | MARGIN -Z | FINISH MARGIN -Z | | | |
| 7 | SURFACE | 13 | 10 | 0 | | | |
| TOOL NUMBER | TOOL | CALL | INCISION -Z | INCISION -R | CIRCUMFERENTIAL SPEED | FEED | |
| 1 | FACE MILL | 30 | 10 | 10 | 20 | 0.075 | |
| SHAPE NUMBER | SHAPE | START POINT -X | START POINT -Z | END POINT -X | END POINT Z | RADIUS R | |
| 1 | STRAIGHT LINE | 15 | -30 | 15 | 30 | | |
| 2 | STRAIGHT LINE | 15 | 30 | 0 | 30 | | |
| 3 | STRAIGHT LINE | 0 | 30 | 0 | -30 | | |
| 4 | STRAIGHT LINE | 0 | -30 | 15 | -30 | | |

FIG.4

| UNIT NUMBER | MACHINING UNIT | ANGLE B | ANGLE C | | | |
|---|---|---|---|---|---|---|
| 8 | MACHINING SURFACE ANGLE | 0 | 90 | | | |
| UNIT NUMBER | MACHINING UNIT | MOVEMENT X | MOVEMENT Y | MOVEMENT Z | MOVEMENT C | ROTATION θ |
| 9 | BASIC COORDINATE MOVEMENT | 0 | 0 | -35 | 0 | 0 |
| UNIT NUMBER | MACHINING UNIT | DEPTH | MARGIN -Z | MARGIN -R | FINISH MARGIN -Z | |
| 10 | LINE CENTER | 10 | 10 | 10 | 0 | |
| TOOL NUMBER | TOOL | CALL | INCISION -Z | INCISION -R | CIRCUMFERENTIAL SPEED | FEED |
| 1 | END MILL | 10 | 10 | 10 | 20 | 0.075 |
| SHAPE NUMBER | SHAPE | START POINT -X | START POINT -Z | END POINT -X | END POINT Z | RADIUS R |
| 1 | STRAIGHT LINE | 55 | 0 | 45 | 0 | |
| UNIT NUMBER | MACHINING UNIT | ANGLE B | ANGLE C | | | |
| 11 | MACHINING SURFACE ANGLE | 0 | 180 | | | |
| UNIT NUMBER | MACHINING UNIT | DEPTH | MARGIN -Z | MARGIN -R | FINISH MARGIN -Z | |
| 12 | LINE CENTER | 10 | 10 | 10 | 0 | |
| TOOL NUMBER | TOOL | CALL | INCISION -Z | INCISION -R | CIRCUMFERENTIAL SPEED | FEED |
| 1 | END MILL | 10 | 10 | 10 | 20 | 0.075 |
| SHAPE NUMBER | SHAPE | START POINT -X | START POINT -Z | END POINT -X | END POINT Z | RADIUS R |
| 1 | STRAIGHT LINE | 55 | 0 | 45 | 0 | |
| UNIT NUMBER | MACHINING UNIT | ANGLE B | ANGLE C | | | |
| 13 | MACHINING SURFACE ANGLE | 0 | 270 | | | |
| UNIT NUMBER | MACHINING UNIT | DEPTH | MARGIN -Z | MARGIN -R | FINISH MARGIN -Z | |
| 14 | LINE CENTER | 10 | 10 | 10 | 0 | |
| TOOL NUMBER | TOOL | CALL | INCISION -Z | INCISION -R | CIRCUMFERENTIAL SPEED | FEED |
| 1 | END MILL | 10 | 10 | 10 | 20 | 0.075 |
| SHAPE NUMBER | SHAPE | START POINT -X | START POINT -Z | END POINT -X | END POINT Z | RADIUS R |
| 1 | STRAIGHT LINE | 55 | 0 | 45 | 0 | |

FIG.5

| UNIT NUMBER | MACHINING UNIT | ANGLE B | ANGLE C | | | | |
|---|---|---|---|---|---|---|---|
| 15 | MACHINING SURFACE ANGLE | 0 | 45 | | | | |
| UNIT NUMBER | MACHINING UNIT | MOVEMENT X | MOVEMENT Y | MOVEMENT Z | MOVEMENT C | ROTATION $\theta$ | |
| 16 | BASIC COORDINATE MOVEMENT | 0 | 0 | 0 | 0 | 0 | |
| UNIT NUMBER | MACHINING UNIT | HOLE DIAMETER | HOLE DEPTH | CHAMFERING | | | |
| 17 | DRILL | 8 | 20 | 1 | | | |
| TOOL NUMBER | TOOL | CALL | MACHINING HOLE DIAMETER | MACHINING HOLE DEPTH | INCISION | CIRCUMFERENTIAL SPEED | FEED |
| 1 | DRILL | 8 | 8 | 20 | 4 | 36 | 0.261 |
| 2 | CHAMFERING CUTTER | 12 | 8 | | 1 | 36 | 0.261 |
| SHAPE NUMBER | SHAPE | Z | X | Y | | | |
| POINT | 0 | 21.5 | 0 | | | | |
| POINT | 0 | 0 | 21.5 | | | | |
| POINT | 0 | -21.5 | 0 | | | | |
| POINT | 0 | 0 | -21.5 | | | | |
| UNIT NUMBER | MACHINING UNIT | | | | | | |
| 18 | MACHINING END | | | | | | |

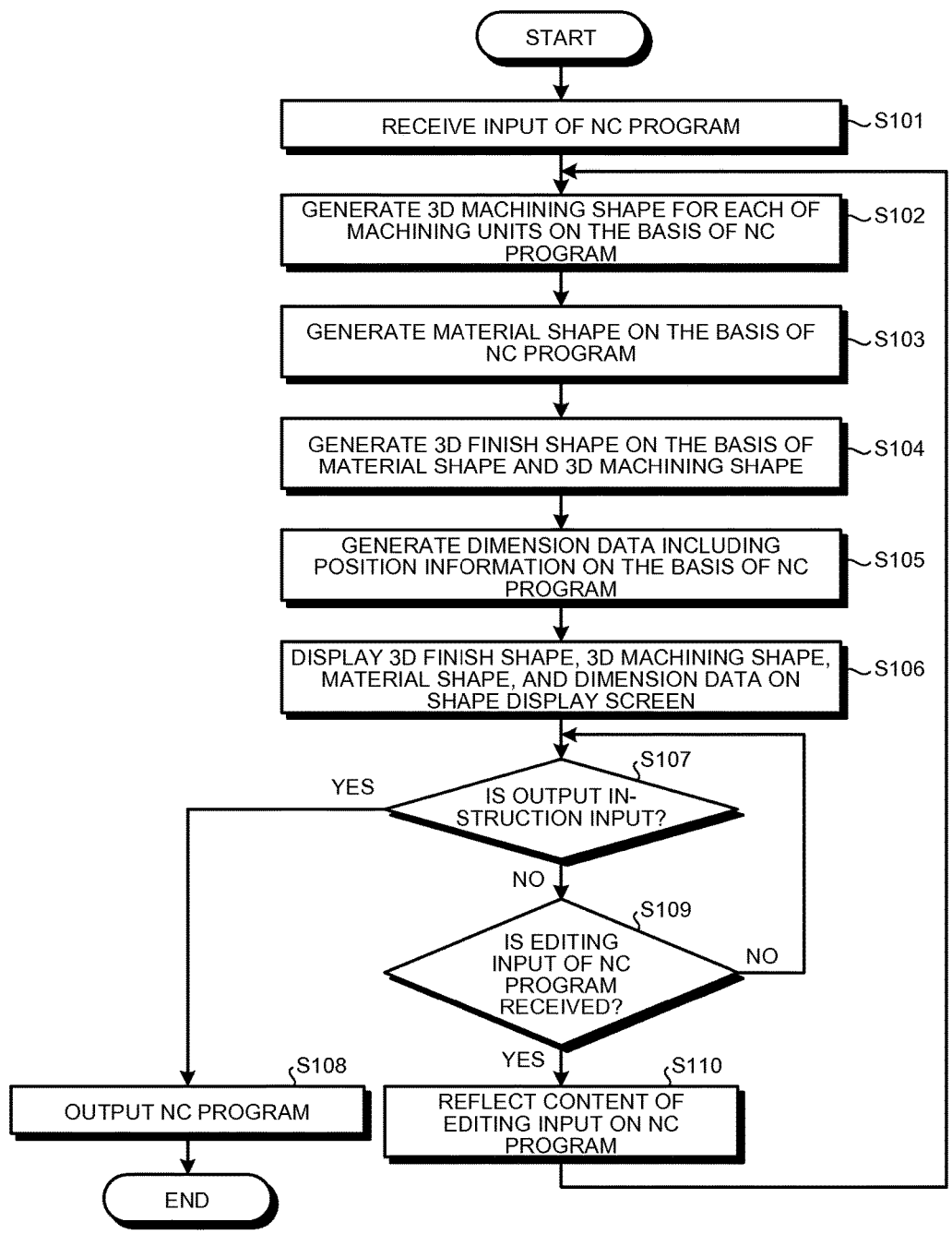

NUMERICAL-CONTROL-PROGRAM EDITING APPARATUS, NUMERICAL-CONTROL-PROGRAM EDITING METHOD, AND PROGRAM

CROSS REFERENCE TO RELATED APPLICATIONS

This application is a National Stage of International Application No. PCT/JP2013/061127 filed Apr. 12, 2013, the contents of all of which are incorporated herein by reference in their entirety.

FIELD

The present invention relates to a numerical-control (NC)-program editing apparatus, a numerical-control-program editing method, and a program for performing editing of a numerical control machining Program (NC program) for numerically controlling a machine tool.

BACKGROUND

In recent years, there is an NC-program creating apparatus with which an operator can create an NC program by simply performing input for setting a coordinate value of a machining target object while looking at a manufacturing drawing. On the market, there is also an NC-program creating apparatus that can directly read CAD data modeled using a CAD system and create an NC program.

Incidentally, when an operator inputs a definition of a machining shape to an NC-program creating apparatus using an input device such as a mouse or a keyboard and causes the NC-program creating apparatus to create an NC program, the operator needs to check whether there is an input mistake of data.

For example, a numerical control apparatus described in Patent Literature 1 includes rendering means for causing an operator to check a defined shape when a definition of a machining shape is input from an input device and includes dimension displaying means for storing a coordinate of a reference point when the machining shape is defined and comparing coordinates of respective end points and the stored coordinate to display dimensions of a shape in addition to rendering of the shape.

A machining-data editing apparatus described in Patent Literature 2 in which, when a predetermined position of a machining shape is designated by position designating means, machining-data detecting means detects machining data corresponding to the designated position and editing control means causes display means to display the detected machining data and enables editing by machining-data editing means.

A numerical control apparatus described in Patent Literature 3 generates any coordinate axis information together with a track of a tool and displays the coordinate axis information on a display device to thereby enable an operator to check an accurate coordinate value of a passing point of the track of the tool

CITATION LIST

Patent Literature

Patent Literature 1: Japanese Patent Application Laid-Open No. H3-201010
Patent Literature 2: Japanese Patent Application Laid-Open No. H1-307805
Patent Literature 3: Japanese Patent Application Laid-Open No. H4-307605

SUMMARY

Technical Problem

However, according to the conventional technologies explained above, None of these apparatuses displays a dimension or a coordinate in a depth direction of a three-dimensional shape. Therefore, there is a problem in that it is not easy for the operator to check an NC program.

The present invention has been devised in view of the above and it is an object of the present invention to obtain an NC-program editing apparatus, a numerical-control-program editing method, and a program with which an operator can easily check an NC program.

Solution to Problem

In order to solve the aforementioned problems, a numerical-control-program editing apparatus according to one aspect of the present invention is constructed to include: a machining-shape generating unit that generates, for each unit of machining, a three-dimensional machining shape including position information in a three-dimensional virtual space on the basis of attribute information, which is dimension information or position information described for each unit of machining configuring a numerical control program (NC program); an attribute processing unit that extracts the attribute information from the NC program and associates three-dimensional position information corresponding to a machining shape corresponding to the extracted attribute information with the extracted attribute information; and a display-screen control unit that displays the NC program on a program display screen and displays, on a shape display screen, a projection drawing in which the machining shape arranged in the virtual space is obliquely projected according to the position information contained in the machining shape, and when receiving an input for editing the NC program via the program display screen, reflects content of the input on the NC program, wherein the display-screen control unit displays the extracted attribute information in a position corresponding to position information associated with the attribute information on the shape display screen.

Advantageous Effects of Invention

The NC-program editing apparatus, the numerical-control-program editing method, and the program according to the present invention can stereoscopically display a machining shape and display dimension information or position information in a corresponding position on the stereoscopically displayed machining shape. Therefore, there is an effect that an operator can easily check an NC program.

BRIEF DESCRIPTION OF DRAWINGS

FIG. 3 is a diagram showing a configuration example of an NC program.

FIG. 4 is a diagram showing a configuration example of the NC program.

FIG. 5 is a diagram showing a configuration example of the NC program.

FIG. 6 is a flowchart for explaining the operation of the NC-program editing apparatus according to the embodiment.

DESCRIPTION OF EMBODIMENTS

Exemplary embodiments of an NC-program editing apparatus, an NC-program editing method, and a program for performing editing of an NC control machining Program according to the present invention are explained in detail below with reference to the drawings. Note that the present invention is not limited by the embodiments.

Embodiment

Figure 1:
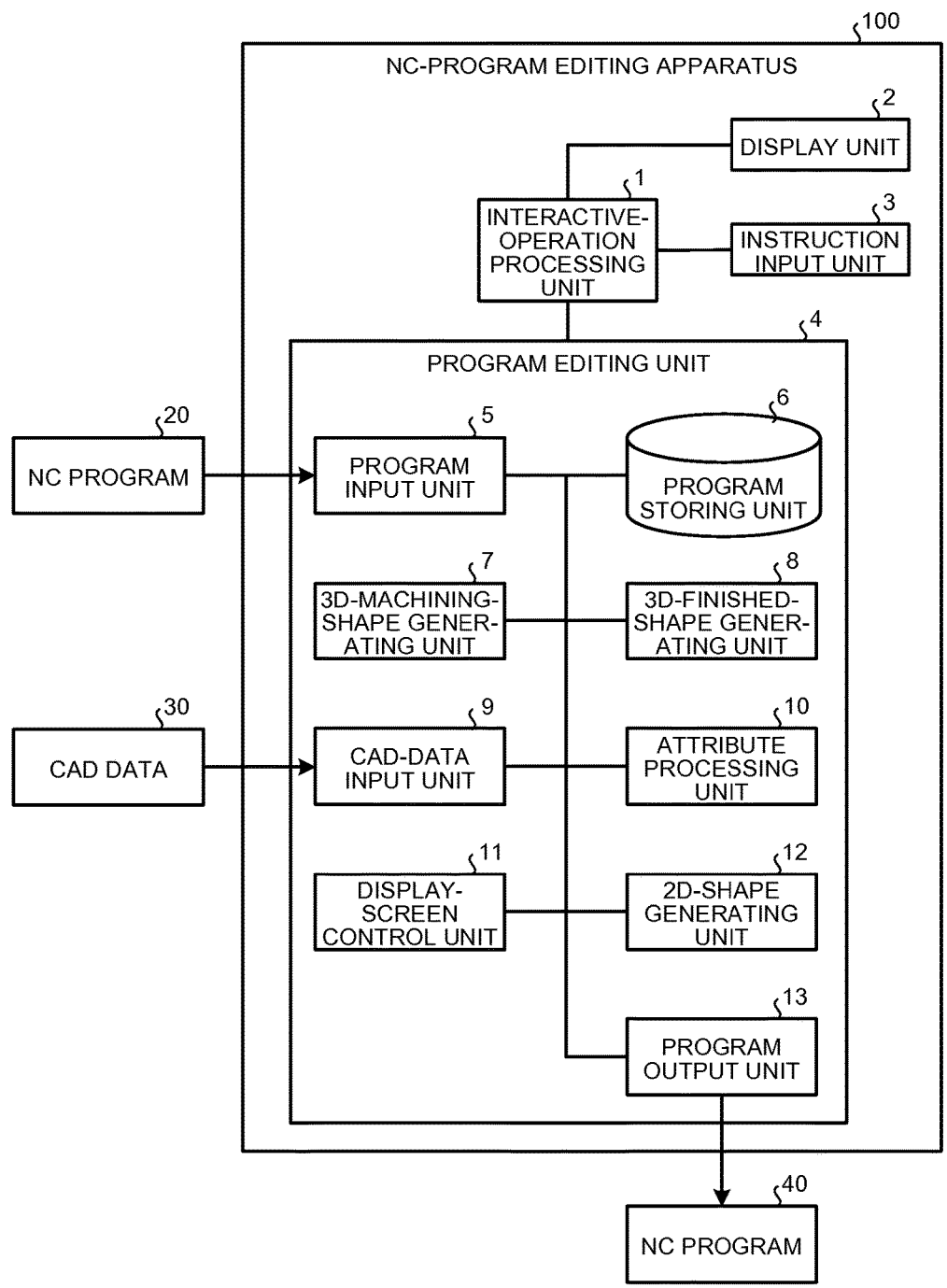
FIG. 1 is a block diagram showing the configuration of an NC-program editing apparatus according to an embodiment of the present invention.

FIG. 1 is a block diagram showing the configuration of an NC-program editing apparatus according to an embodiment of the present invention. An NC-program editing apparatus 100 is an apparatus for editing an NC program. The NC program is a program for controlling a numerical control apparatus. The numerical control apparatus operates a machine tool on the basis of the NC program to thereby machine a machining target material (a workpiece before machining) and form a product having a finished shape (a workpiece after the machining)

The NC-program editing apparatus 100 includes an interactive-operation processing unit 1, a display unit 2, an instruction input unit 3, and a program editing unit 4. The interactive-operation processing unit 1 is connected to the display unit 2, the instruction input unit 3, and the program editing unit 4. The program editing unit 4 includes a program input unit 5, a program storing unit 6, a 3D-machining-shape generating unit (a machining-shape generating unit) 7, a 3D-finished-shape generating unit (a finished-shape generating unit) 8, a CAD-data input unit 9, an attribute processing unit 10, a display-screen control unit 11, a 2D-shape generating unit 12, and a program output unit 13.

Among the functional components included in the NC-program editing apparatus 100, a part or all of the interactive-operation processing unit 1, the program input unit 5, the program storing unit 6, the 3D-machining-shape generating unit 7, the 3D-finished-shape generating unit 8, the CAD-data input unit 9, the attribute processing unit 10, the display-screen control unit 11, the 2D-shape generating unit 12, and the program output unit 13 are realized by software, hardware, or a combination of the software and the hardware. The program storing unit 6 is configured by a memory or a register. Being realized by the software means that, in a computer including a storage device and an arithmetic device, the storage device stores a predetermined program in advance and the arithmetic device executes the predetermined program stored by the storage device to thereby function as relevant functional components. Whether the functional components are realized by the hardware or realized by the software depends on a specific implementation form or a design limitation imposed on the entire apparatus. Note that, as a recording medium of a load sourced of the computer program for realizing the functional components, besides the storage device included in the computer, any medium can be applied as long as the medium is a non-transitory tangible medium. For example, a CD-ROM, a DVD-ROM, an external storage device, or a detachable memory device can be applied as the recording medium.

Note that the NC-program editing apparatus 100 can be realized by a single computer or a plurality of computers connected by a network. The NC-program editing apparatus 100 can be realized using a control computer of any arbitrary apparatus. For example, the NC-program editing apparatus 100 can be realized on a control computer of a numerical control apparatus. The NC-program editing apparatus 100 can be realized on a computer functioning as an NC-program creating apparatus that automatically generates an NC program according to a defined shape or CAD data.

The display unit 2 is a device for displaying a display screen and is, for example, a liquid crystal monitor. The instruction input unit 3 includes a mouse and a keyboard and receives an input of operation information and the like from an operator. The operation information input via the instruction input unit 3 is sent to the interactive-operation processing unit 1.

The interactive-operation processing unit 1 provides a GUI environment. That is, for example, the interactive-operation processing unit 1 displays, on the display unit 2, a display screen sent from the program editing unit 4 and, when the mouse is clicked in a state in which a cursor is displayed on the display screen, sends, to the program editing unit 4, a screen coordinate of a clicked part and notification to the effect that the mouse has been clocked.

The program input unit 5 receives an input of an NC program 20 from an external storage device (not shown in the figure) or the like and stores the NC program 20 in the program storing unit 6.

The 3D-machining-shape generating unit 7 generates a 3D machining shape, which is a three-dimensional model of a shape removed by machining, according to the NC program stored in the program storing unit 6. Then NC program is configured by a plurality of instruction data. Note that a minimum unit of a set of instruction data for defining one or a plurality of same machining shapes is referred to as a unit of machining (or may be referred to just as "a machining unit"). The 3D-machining-shape generating unit 7 generates a three-dimensional machining shape model (hereinafter, 3D machining shape) for each unit of machining. Note that respective 3D machining shapes generated by the 3D-machining-shape generating unit 7 include position information in a three-dimensional virtual space such that a positional relation among the 3D machining shapes is equal to a positional relation among machining shapes for each unit of machining based on the NC program. The position information in the three-dimensional virtual space is represented using a single coordinate system. The coordinate system on which the position information of the 3D machining shape is based can be any coordinate system. However, it is assumed that a one-to-one correspondence relation holds between the coordinate system and a non-relative coordinate system (e.g., a machine coordinate system) based on the NC program. Note that the configuration of the NC program is explained in detail below.

The 3D-finished-shape generating unit 8 generates a three-dimensional model of a material shape (hereinafter, simply, material shape) according to the NC program stored in the program storing unit 6. The 3D-finished-shape generating unit 8 generates a 3D finished shape, which is a three-dimensional model of a finished shape, on the basis of the generated material shape and the 3D machining shape generated by the 3D-machining-shape generating unit 7. Like the 3D machining shape, the material shape and the 3D finished shape generated by the 3D-finished-shape generating unit 8 include position information in a virtual space. That is, a coordinate system on which the position information of the material shape and the 3D finished shape is based is equal to the coordinate system on which the position information of the 3D machining shape is based. In the following explanation, the 3D machining shape, the 3D finished shape, and the material shape are sometimes generally referred to as 3D shapes.

The CAD-data input unit 9 receives an input of CAD data 30 from a CAD system (not shown in the figure) or an external storage device (not shown in the figure) and arranges the CAD data 30 in a coordinate system based on the NC program. The CAD data 30 includes, for example, information concerning a product, information concerning a material, and information concerning a machining instruction used when the product is formed from the material. The information concerning the product in the CAD data 30 includes, for example, shape data of the product. The shape data of the product (hereinafter referred to as product shape data) is generated using, for example, a CAD system and includes information indicating the shape and the dimension of the product.

The attribute processing unit 10 extracts dimension data, which is attribute information described for each unit of machining in the NC program stored in the program storing unit 6. The attribute processing unit 10 arranges the dimension data in the 3D shapes. In other words, the attribute processing unit 10 associates, with the extracted dimension data, position information corresponding to the 3D machining shape corresponding to the dimension data. The dimension data includes dimension information or position information defining the 3D shapes or both of the dimension information and the position information. For example, length information of the 3D shapes, distance information between the 3D shapes, or coordinate value information where the 3D shapes are located corresponds to the dimension data.

The display-screen control unit 11 generates a display screen displayed on the display unit 2 and interprets operation information input via the display screen by the operator.

Figure 2:
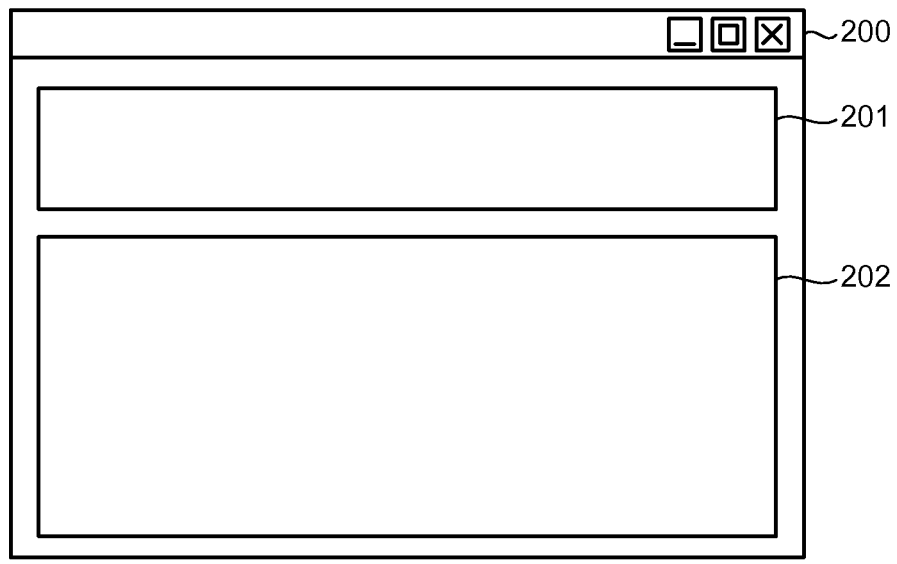
FIG. 2 is a diagram showing an example of a display screen generated by a display-screen control unit.

FIG. 2 is a diagram showing an example of the display screen generated by the display-screen control unit 11. As shown in the figure, a display screen 200 includes a program display screen 201 and a shape display screen 202. The display-screen control unit 11 displays a part or the entire NC program on the program display screen 201. The display-screen control unit 11 stereoscopically displays the 3D shapes, in which the dimension data is arranged, on the shape display screen 202. Specifically, the display-screen control unit 11 generates, as explained below, an image to be displayed on the shape display screen 202. The display-screen control unit 11 arranges the 3D shapes in positions indicated by position information respectively included in the 3D shapes on a three-dimensional virtual space and obliquely projects the arranged 3D shapes on a two-dimensional plane from viewpoints decided in advance. The display-screen control unit 11 displays, on the shape display screen 202, a projection drawing generated by obliquely projecting the 3D shapes on the two-dimensional plane. Note that the viewpoint of the projection can be set by the operator as desired. The dimension data is displayed in the respective 3D shapes. Display positions of the dimension data are based on the position information given to the dimension data.

The shape display screen 202 can receive an input for designating the dimension data being displayed. The input for designating the dimension data being displayed means that, for example, the dimension data being displayed is clicked. Specifically, when the mouse is clicked in a state in which a mouse cursor is placed on the dimension data displayed on the shape display screen 202, the interactive-operation processing unit 1 sends a clicked screen coordinate to the display-screen control unit 11. The display-screen control unit 11 specifies the designated dimension data according to the screen coordinate. The display-screen control unit 11 finds out a part where the specified dimension data is described in the NC program and highlights the found-out part on the program display screen 201.

When a machining shape, which requires setting of a track of a tool, is created anew, the 2D-shape generating unit 12 generates a track shape indicating an initial value of the track of the tool. The generated track shape includes position information in a virtual space. The generated track shape is sent to the display-screen control unit 11.

The program output unit 13 outputs the NC program (an NC program 40) stored in the program storing unit 6 to the outside. After editing of the NC program is completed, the operator can input an instruction for outputting the NC program (an output instruction) to the instruction input unit 3. When detecting the output instruction, the interactive-operation processing unit 1 sends the output instruction to the program editing unit 4. When receiving the output instruction, the program output unit 13 outputs the NC program stored in the program storing unit 6 to the outside.

The configuration of the NC program is explained. FIG. 3, FIG. 4, and FIG. 5 are diagrams showing configuration examples of the NC program. Note that FIGS. 3 to 5 respectively show partial programs obtained by dividing the same NC program.

In the NC program shown in FIG. 3 to FIG. 5, a unit number is an identification number allocated to units of machining. Note that, for convenience, instruction data for setting a material shape, a basic coordinate, a machining surface angle, and the like are respectively treated as machining units.

A machining unit of a unit number #0 is a unit of machining (a material machining unit) including instruction data for setting the material shape. The material machining unit includes attributes (items) for respectively setting the material shape and a material quality. It is assumed that the shape of a machining target material is a cylindrical shape. A "material quality" item is an item for setting the quality of a material to be machined. A "material outer diameter" item is an item for setting a maximum outer diameter of the material (a material outer diameter). A "material inner diameter" item is an item for setting a minimum inner diameter of the material (a material inner diameter). A "material length" item is an item for setting the length in the axial direction of the material shape. A "material end face length" item is an item for setting the length of a material projecting section (material length) from a work origin in a −Z-axis direction. A "rotating speed" item is an item for setting maximum rotating speed of a spindle rotating speed in turning. Note that a Z axis of a work coordinate system is a turning rotation axis, and in the case of the turning, machining is performed in a +Z-axis direction.

A machining unit of a unit number #1 is a unit of machining (a basic coordinate machining unit) including instruction data for setting a work origin position (a basic coordinate). The basic coordinate machining unit includes a plurality of items for setting a distance and a direction from a machine origin to the work origin. For example, an "X" item is an item for setting a coordinate value from the machine origin to the work origin in an X-axis direction. A "Y" item is an item for setting a coordinate value from the machine origin to the work origin in a Y-axis direction. A "Z" item is an item for setting a coordinate value from the machine origin to the work origin in a Z-axis direction. A "θ" is an item for setting an angle formed by the machine coordinate system and the work coordinate system. A "C" item is an item for setting a component centering on a turning rotation axis in an angle formed by the machine coordinate system and the work coordinate system.

A machining unit of a unit number #2 and a machining unit of a unit number #15 are units of machining (machining surface angle machining units) including instruction data for setting an angle of a machining surface. The machining surface angle machining unit includes a plurality of items for setting an angle of the machining surface. An "angle B" item is an item for setting an angle for deducing a mill shaft head. An "angle C" item is an item for setting an angle for deducing a C axis, which is a turning axis.

A machining unit of a unit number #3 is a unit of machining (an end face machining unit) for instructing machining for shaving off a projecting section of a material end face. The end face machining unit includes end face machining instruction data for setting a portion to be shaved off, tool instruction data for setting a tool and conditions related to the tool, and shape instruction data for setting a shape machined by end face machining. The end face machining instruction data includes a "machining section" item, which is an item for setting a machining position, and an "incision-X" item and an "incision-Z" item, which are items for setting coordinate values of respective incision points. Note that, in the "machining section" item, a front surface is set when an end face on a −Z side is machined and a rear surface is set when an end face on a +Z side is machined. The tool instruction data includes a "tool number" item in which an identification number allocated when a tool used in the end face machining unit is set is stored, a "tool" item for setting the tool, a "call" item, a "circumferential speed" item, and a "feed" item. The shape instruction data includes a "shape number" item in which identification number allocated to each of elements for defining a shape machined by end face machining is stored, a "shape" item for setting an element for defining the shape machined by the end face machining, and an item for setting a specific numerical value. The element for defining the shape machined by the end face machining specifically means one or more elements configuring a wire shape for defining a machining surface. In the "shape" item, a line type such as a "line" or an "arc" is set. The item for setting a specific numerical value includes, for example, a "start point coordinate" item, an "end coordinate" item, and a "radius R" item. When the "line" is set in the "shape" item, the "start point coordinate" item and the "end point coordinate" item are used. Note that a coordinate value of the end face machining is set using an XZ plane. When the "arc" is set in the "shape" item, the "radius R" item, which is an item for setting a radius of an arc, is further used.

A machining unit of a unit number #4 is a unit of machining (a turning unit) for instructing machining (turning) for turning the outer circumference, the inner circumference, the front surface, or the rear surface of a round bar using a general turning tool. The turning unit includes turning instruction data for setting a portion to be generally turned, tool instruction data for setting a tool and conditions related to the tool, and shape instruction data for setting a shape machined by a turning tool. The turning instruction data includes a "machining section" item, which is an item for setting a machining position, and an "incision-X" item and an "incision-Z" item, which are items for setting coordinate values of respective incision points. Note that, in the "machining section" item, an "outer diameter" is set when the outer circumference is machined, an "inner diameter" is set when then inner circumference is machined, a "front surface" is set when the front surface is machined, and a "rear surface" is set when the rear surface is machined. The tool instruction data includes a "tool number" item in which an identification number allocated when a tool used in a unit of turning is set is stored, a "tool" item, a "call" item, a "circumferential speed" item, and a "feed" item. The shape instruction data includes a "shape number" item in which identification number allocated to each of elements for defining a shape to be machined by the turning is stored, a "shape" item for setting an element for defining a shape to be machined by the turning, and an item for setting a specific numerical value. The element for defining a shape machined by the turning specifically means one or more elements configuring a track of the tool. In the "shape" item, a line type such as a "line" or an "arc" is set. The item for setting a specific numerical value is the same as the item explained in the end face machining unit.

A machining unit of a unit number #6, a machining unit of a unit number #9, and a machining unit of a unit number #16 are units of machining (basic coordinate movement machining units) for instructing movement of the work origin position. The basic coordinate movement machining unit includes a "movement X" item, which is an item for setting a movement amount in the X-axis direction from the work origin position set by the basic coordinate machining unit, a "movement Y" item for setting a movement amount in the Y-axis direction from the work origin position set by the basic coordinate machining unit, a "movement Z" item, which is an item for setting a movement amount in the Z-axis direction from the work origin position set by the basic coordinate machining unit, a "movement C", which is an item for setting a turning angle from an angle set by the basic coordinate machining unit of the C axis, and a "rotation θ" item, which is an item for setting an angle for rotating a work coordinate system on an XY plane after a machining surface is deduced.

A machining unit of a unit number #7 is a unit of machining (a surface machining unit) for instructing machining (surface machining) for flattening the surface of a material using a face mill. The surface machining unit includes surface machining instruction data for setting depth machined by the surface machining, tool instruction data for setting a tool and conditions related to the tool, and shape instruction data for setting a shape of a region machined by the surface machining. The surface machining instruction data includes a "depth" item, which is an item for setting a distance in the Z-axis direction from the work origin to a machining finished surface, a "margin-Z" item, which is an item for setting length of a margin, that is, length in the Z-axis direction in the work coordinate system, and a "finish margin-Z" item, which is an item for setting length of a finish margin in performing finishing, that is, length in the Z-axis direction in the work coordinate system. The tool instruction data includes a "tool number" item in which an identification number allocated when a tool used in a unit of surface machining is set is stored, a "tool" item, a "call" item, a "circumferential speed" item, and a "feed" item. The shape instruction data includes a "shape number" item in which an identification number allocated to each of elements for defining a shape of a region machined by the surface machining is stored, a "shape" item, which is an item for setting an element for defining a shape of a region machined by the surface machining, and an item for setting a specific numerical value. The element for defining a shape of a region machined by the surface machining means one or more elements configuring a boundary of the region. In the "shape" item, a line type such as a "straight line" or an "arc" is set. The item for setting a specific numerical value includes, for example, a "start point coordinate" item, an "end point coordinate" item, and a "radius R" item. When the "straight line" is set in the "shape" item, the "start point coordinate" item and the "end point coordinate" item are used. When the "arc" is set in the "shape" item, the "radius R", which is an item for setting a radius of an arc, is further used.

Each of a machining unit of a unit number #10, machining unit of a unit number #12, and a machining unit of a unit number #14 is a unit of machining (line center machining unit) for instructing machining (line center machining) for moving the center of a tool along a track set in a unit of machining. The line center machining unit includes line machining instruction data for setting, for example, depth machined by the line center machining, tool instruction data for setting a tool and conditions related to the tool, and shape instruction data for designating a shape of a track for moving the center of the tool according to the line center machining. The line machining instruction data includes a "depth" item, which is an item for setting a distance in the Z-axis direction from the work origin to a machining finished surface, a "margin-Z" item, which is an item for setting length of a margin, that is, length in the Z-axis direction (an axial direction margin) in the work coordinate system, a "margin-R" item, which is an item for setting length of a margin, that is, length on the XY plane (a radial direction margin) in the cork coordinate system, and a "finish margin-Z", which is an item for setting length of a finish margin in performing finishing, that is, length in the Z-axis direction in the work coordinate system. The tool instruction data includes a "tool number" item in which an identification number allocated when a tool used in the line center machining unit is set is stored, a "tool" item, a "call" item, a "circumferential speed" item, and a "feed" item. The shape instruction data includes a "shape number" item in which an identification number allocated to each of elements for defining a shape of a track of the tool is stored, a "shape" item, which is an item for setting an element for defining the shape of the track of the tool, and an item for setting a specific numerical value. In the "shape" item, a line type such as a "straight line" or an arc" is set. The item for setting a specific numerical value is the same as the item explained in a unit of surface machining.

Note that the line center machining is one kind of machining (line machining) for moving a tool along a linear track. The line machining includes, besides the line center machining, line right side machining for moving the tool along a track on which the left end of the tool (the left side of the tool at the time when a traveling direction of the tool is the front) is set, line left side machining for moving the tool along a track on which the right end of the tool (the right side of the tool at the time when the traveling direction of the tool is the front) is set. The data and the items included in a unit of machining of the line right side machining and a unit of machining of the line left side machining are respectively the same as the data and the items of the line center machining.

A machining unit of a unit number #17 is a unit of machining (a drilling unit) for instructing drilling by a drill. The drilling unit includes a hole machining instruction data for setting dimensions of a hole, tool instruction data for setting a tool and conditions related to the tool, and shape instruction data for setting a position machined by the drilling. The hole machining instruction data includes a "hole diameter" item, which is an item for setting a diameter of a hole, a "hole depth" item, which is an item for setting depth of the hole, and a "chamfering" item, which is an item for setting length in which chamfering is executed when an edge of the hole is chamfered. The tool instruction data includes a "tool number" item in which an identification number allocated when a tool used in the drilling unit is set is stored, a "tool" item, a "call" item, a "circumferential speed" item, a "feed" item, a "machining hole diameter" item, and a "machining hole depth" item. The shape instruction data includes a "shape number" item in which an identification number allocated to each of machining positions is stored, a "shape" item, which is an item for setting a type of the shape of a position, and a "coordinate value" item, which is an item for setting a position. The "coordinate value" item is set using an XYZ coordinate.

Note that the drilling unit is one kind of machining (hole machining) for opening a hole in a material shape. The hole machining includes, besides the drilling, reaming or tapping. Data and items included in a unit of machining of the reaming and a unit of machining of the tapping are respectively the same as the data and the items of the drilling.

The operation of the NC-program editing apparatus 100 is explained. FIG. 6 is a flowchart for explaining the operation of the NC-program editing apparatus 100 according to the embodiment.

First, the program input unit 5 receives an input of the NC program 20 (step S101). The program input unit 5 stores the received NC program 20 in the program storing unit 6.

Subsequently, a 3D-machining-shape generating unit 7 generates a 3D machining shape for each unit of machining according to the NC program stored in the program storing unit 6 (step S102). The generated 3D machining shape is sent to the 3D-finished-shape generating unit 8 and the display-screen control unit 11.

Subsequently, the 3D-finished-shape generating unit 8 generates a material shape according to the NC program stored in the program storing unit 6 (step S103). The 3D-finished-shape generating unit 8 generates a 3D finished shape by subtracting the 3D machining shape generated by the 3D-machining-shape generating unit 7 from the generated material shape (step S104). The generated 3D finished shape is sent to the display-screen control unit 11.

Subsequently, the attribute processing unit 10 extracts dimension data for each unit of machining from the NC program stored in the program storing unit 6 and associates position information with the created dimension data (step S105). For example, the attribute processing unit 10 associates a part (or the vicinity of the part) representing an item in which dimension data of the 3D shapes (the 3D machining shape and the material shape) is set with position information of the dimension data. Note that the position information given to the dimension data can be represented by relative position from the 3D machining shape corresponding to position information. The dimension data associated with the position information is sent to the display-screen control unit 11.

Subsequently, the display-screen control unit 11 generates image data for displaying the 3D finished shape generated by the 3D-finished-shape generating unit 8, the 3D machining shape generated by the 3D-machining-shape generating unit 7, and the dimension data and displays the generated image data on the shape display screen 202 (step S106). A display position of the dimension data is a position based on the position information associated with the dimension data. Note that the display-screen control unit 11 can display, according to an instruction of the operator, instead of the 3D finished shape, the CAD data 30 input by the CAD-data input unit on the shape display screen 202.

The NC-program editing apparatus 100 can receive an output instruction and an editing input for the NC program. The program output unit 13 determines whether or not the output instruction is input (step S107). When the output instruction is input (Yes at step S107), the program output unit 13 outputs the NC program stored in the program storing unit 6 to the outside (step S108). The operation of the NC-program editing apparatus 100 ends.

When the output instruction is not input (No at step S107), the display-screen control unit 11 determines whether or not an editing input for the NC program is received via the program display screen 201 (step S109). When the editing input for the NC program is received (Yes at step S109), the display-screen control unit 11 reflects contents of the editing input on the NC program stored in the program storing unit 6 (step S110), and the processing at step S102 is executed again. When the editing input for the NC program is not received (No at step S109), the processing at step S107 is executed again.

The processing at step S102 is explained for each of types of machining.

Figure 7:
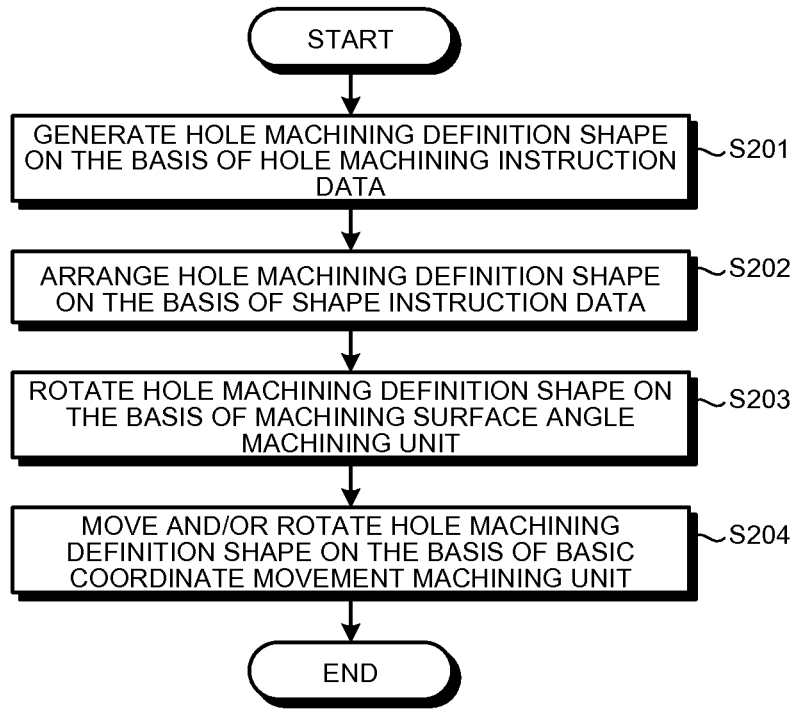
FIG. 7 is a flowchart for explaining a processing procedure in which a 3D-machining-shape generating unit generates a 3D machining shape in a unit of hole machining.

FIG. 7 is a flowchart for explaining a processing procedure in which the 3D-machining-shape generating unit 7 generates a 3D machining shape in a unit of hole machining. First, the 3D-machining-shape generating unit 7 generates a hole machining definition shape on the basis of a hole diameter set in a "hole diameter" item, hole depth set in a "hole depth" item, and a chamfering amount set in a "chamfering" item in hole machining instruction data (step S201).

The hole machining definition shape is generated, for example, as explained below. First, a solid model of a column having the hole diameter as a diameter and having the hole depth as length in the axial direction is generated. Thereafter, a solid model of a frustum having (the hole diameter+the chamfering amount×2) as a major diameter, having the hole diameter as a minor diameter, and having the chamfering amount as length in the axial direction is generated. The solid model of the column and the solid model of the frustum are arranged to keep a predetermined positional relation each other and a sum operation of the two solid models is performed, whereby the hole machining definition shape is generated.

Subsequently, the 3D-machining-shape generating unit 7 arranges the generated hole machining definition shape in a coordinate set in shape instruction data (step S202). When a plurality of coordinates are defined in the shape instruction data, the 3D-machining-shape generating unit 7 copies the hole machining definition shape by a defined number and arranges the copied hole machining definition shapes in the respective coordinates.

Subsequently, the 3D-machining-shape generating unit 7 rotates the generated hole machining definition shape to match a machining surface (step S203). In the processing at step S203, a machining surface set by the last machining surface angle machining unit among machining surface angle machining units instructed before a unit of hole machining is used. In the following explanation, the last machining surface angle machining unit among machining surface angel machining units instructed before a unit of machining to which attention is paid is sometimes referred to as "immediately preceding machining surface angle machining unit".

Subsequently, the 3D-machining-shape generating unit 7 moves and rotates the hole machining definition shape after the rotation by a movement/rotation amount of the work origin position (step S204). In the processing at step S204, a movement/rotation amount set by the last basic coordinate movement machining unit among basic coordinate movement machining units instructed before a unit of hole machining is used. In the following explanation, the last basic coordinate movement machining angle among basic coordinate movement machining units instructed before a unit of machining to which attention is paid is sometimes referred to as "immediately preceding basic coordinate movement machining unit".

Consequently, the generation of the 3D machining shape in a unit of hole machining is completed. The position information determined by the processing at step S203 and step S204 is incidental to the generated 3D machining shape in a unit of hole machining.

Figure 8:
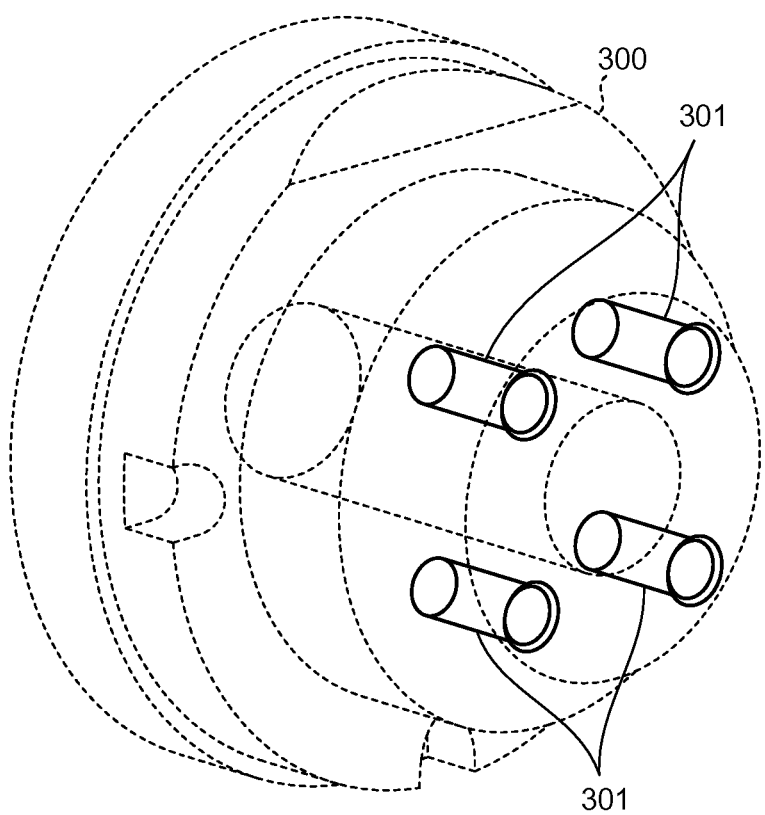
FIG. 8 is a diagram showing an example of the 3D machining shape in a unit of hole machining.

FIG. 8 is a diagram showing an example of the 3D machining shape in a unit of hole machining. A shape 300 indicated by a broken line is a finished machining shape by the NC program shown in FIGS. 3 to 5. Shapes 301 indicated by solid lines are 3D machining shapes set by a unit of hole machining of the unit number #17.

Figure 9:
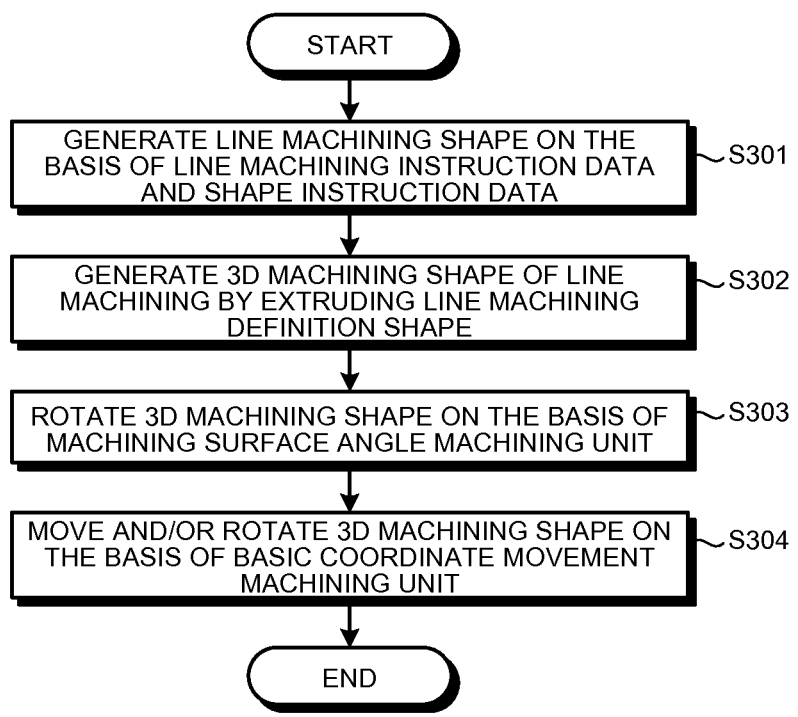
FIG. 9 is a flowchart for explaining a processing procedure in which the 3D-machining-shape generating unit generates a 3D machining shape in a unit of line machining.

FIG. 9 is a flowchart for explaining a processing procedure in which the 3D-machining-shape generating unit 7 generates a 3D machining shape in a unit of line machining. First, the 3D-machining-shape generating unit 7 generates a line machining definition shape on the basis of a radial direction margin set in a "margin-R" item in line machining instruction data and the shape of a track of a tool set in the shape instruction data (step S301).

The line machining definition shape is generated, for example, as explained below. First, a wire shape is generated on the basis of the shape of the track of the tool set in the line machining shape data. A generation method for the wire shape is different according to types of line machining (line right side machining, line left side machining, and line center machining). When the line right side machining is instructed, a shape obtained by offsetting the shape of the track of the tool to the right side of the track of the tool (the right side when a traveling direction of the tool is viewed in the front) by the length of the radial direction margin is calculated. An end point of the shape of the track of the tool and an end point of the shape obtained by offsetting the shape of the track of the tool are interpolated by a wire, whereby a wire shape of a closed loop shape is generated. When the line left side machining is instructed, a shape obtained by offsetting the shape of the track of the tool to the left side of the track of the tool (the left side of the traveling direction of the tool viewed in the front) by the length of the radial direction margin is calculated. An end point of the shape of the track of the tool and an end point of the shape obtained by offsetting the shape of the track of the tool are interpolated by a wire, whereby a wire shape of a closed loop shape is generated. When the line center machining is instructed, shapes respectively obtained by offsetting the shape of the track of the tool to the left and right of the track of the tool by half length of the length of the radial direction margin are respectively calculated. Thereafter, end points of the calculated respective shapes are interpolated by a wire, whereby a wire shape of a closed loop shape is generated. Note that, in both the cases, the end points are interpolated using a semicircular arc having the radial direction margin as a diameter. The semicircular arc can be approximately represented by a plurality of short straight lines. After the wire shape is generated, a surface having the generated wire shape as a boundary is set as the line machining definition shape.

Subsequently, the 3D-machining-shape generating unit 7 extrudes the generated line machining definition shape by the length of the axial direction margin set in the "margin-Z" item in the line machining instruction data to thereby generate a 3D machining shape of the line machining (step S302).

Subsequently, the 3D-machining-shape generating unit 7 rotates the generated 3D machining shape to match the machining surface (step S303). The 3D-machining-shape generating unit 7 moves and rotates the 3D machining shape after the rotation by a movement/rotation amount of the work origin position (step S304). For the rotation for matching the 3D machining shape to the machining surface and the movement/rotation by the movement/rotation amount of the work origin position, as in the case of a unit of hole machining, values respectively set by the immediately preceding machining surface angle machining unit and the immediately preceding basic coordinate movement machining unit are used. Consequently, the generation of the 3D machining shape in a unit of line machining is completed.

The position information determined by the processing at step S303 and step S304 is incidental to the generated 3D machining shape in a unit of line machining.

Figure 10:
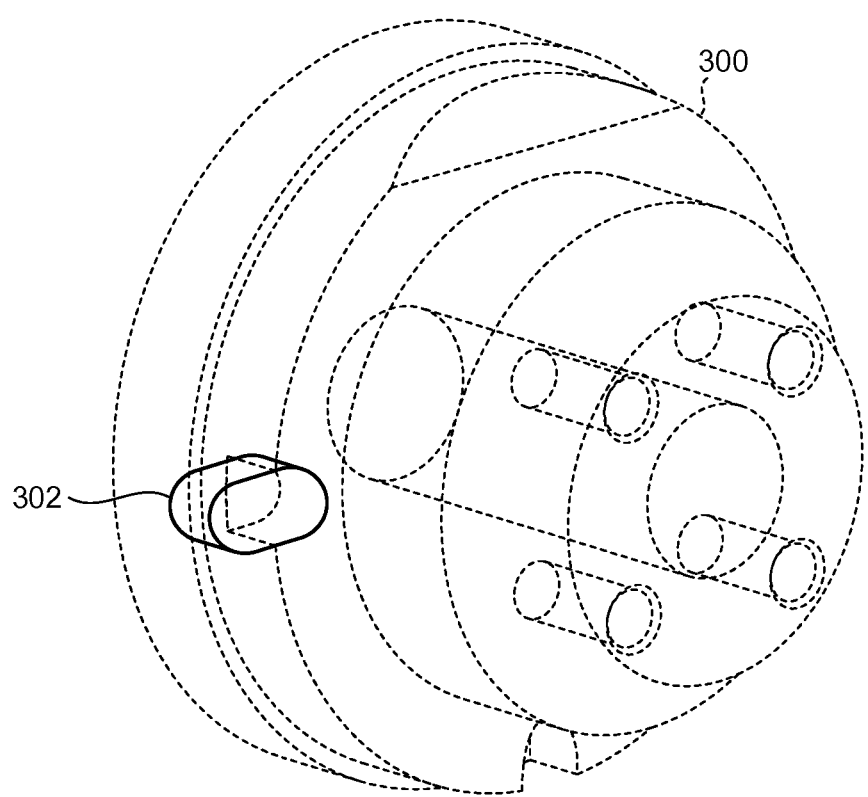
FIG. 10 is a diagram showing an example of the 3D machining shape in a unit of line machining.

FIG. 10 is a diagram showing an example of a 3D machining shape in a unit of line machining. The shape 302 indicated by a solid line is a 3D machining shape set by a unit of line machining of the unit number #10.

Figure 11:
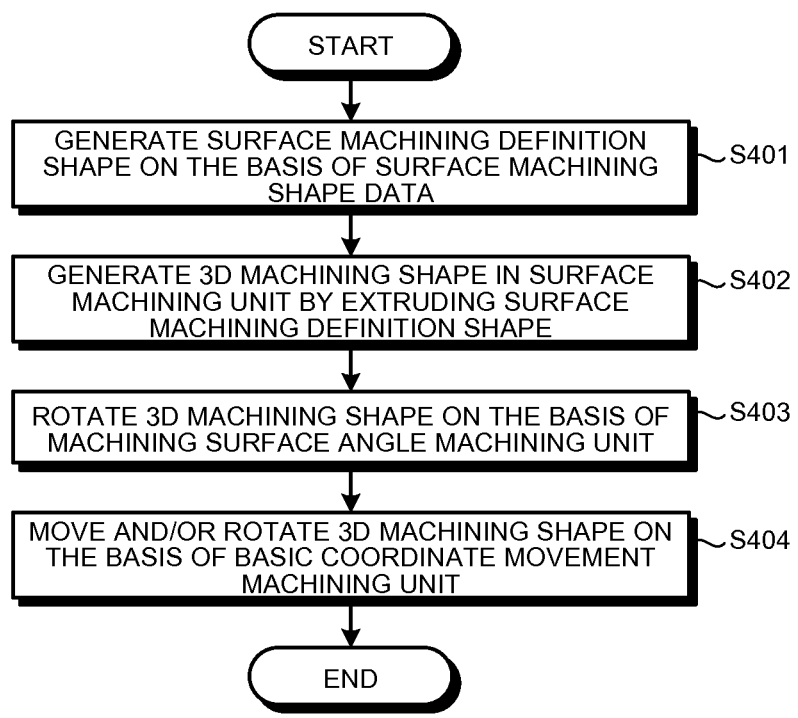
FIG. 11 is a flowchart for explaining a processing procedure in which the 3D-machining-shape generating unit generates a 3D machining shape in a unit of surface machining.

FIG. 11 is a flowchart for explaining a processing procedure in which the 3D-machining-shape generating unit 7 generates a 3D machining shape in a unit of surface machining. First, the 3D-machining-shape generating unit 7 generates a surface machining definition shape indicating a machining surface on the basis of surface machining shape data (step S401). The surface machining definition shape is generated, for example, as explained below. First, a wire shape of a closed loop shape indicating the machining surface is generated on the basis of the surface machining shape data. A surface having the wire shape as a boundary corresponds to the surface machining definition shape.

Subsequently, the 3D-machining-shape generating unit 7 extrudes the generated surface machining definition shape by the length of the margin set in the "margin-Z" item in the surface machining instruction data to thereby generate a 3D machining shape in a unit of surface machining (step S402). The 3D-machining-shape generating unit 7 rotates the generated 3D machining shape to match the machining surface (step S403). The 3D-machining-shape generating unit 7 moves and rotates the 3D machining shape after the rotation by a movement/rotation amount of the work origin position (step S404). For the rotation for matching the 3D machining shape to the machining surface and the movement/rotation by the movement/rotation amount of the work origin position, as in the case of a unit of hole machining, values respectively set by the immediately preceding machining surface angle machining unit and the immediately preceding basic coordinate movement machining unit are used. Consequently, the generation of the 3D machining shape in a unit of surface machining is completed. The position information determined by the processing at step S403 and step S404 is incidental to the generated 3D machining shape in a unit of surface machining.

Figure 12:
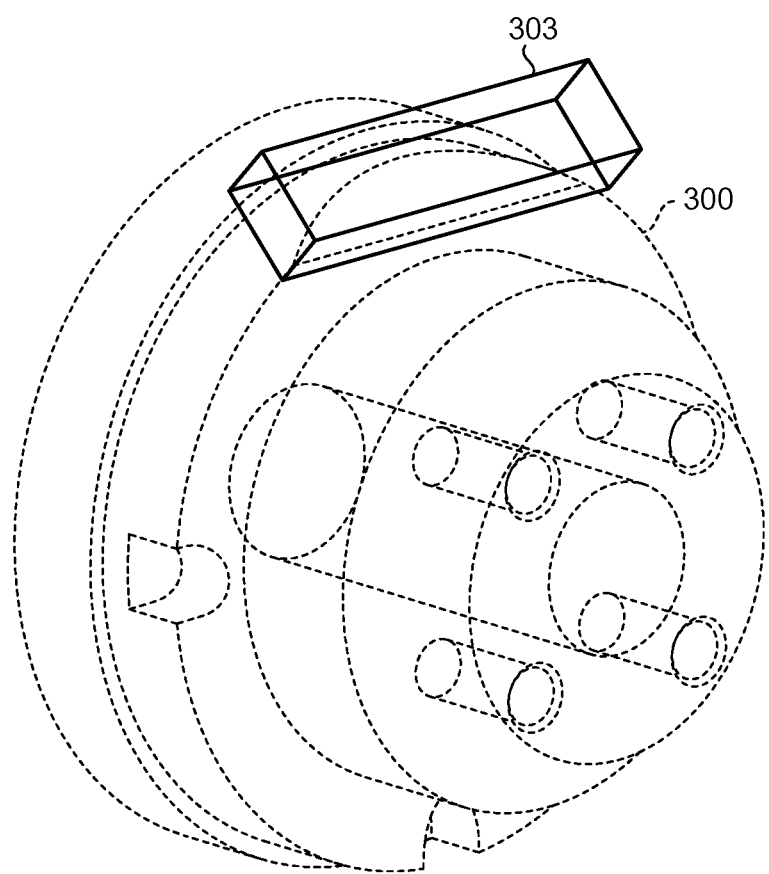
FIG. 12 is a diagram showing an example of the 3D machining shape in a unit of surface machining.

FIG. 12 is a diagram showing an example of the 3D machining shape in a unit of surface machining. A shape 303 indicated by a solid line is a 3D machining shape set by a unit of surface machining of the unit number #7.

Figure 13:
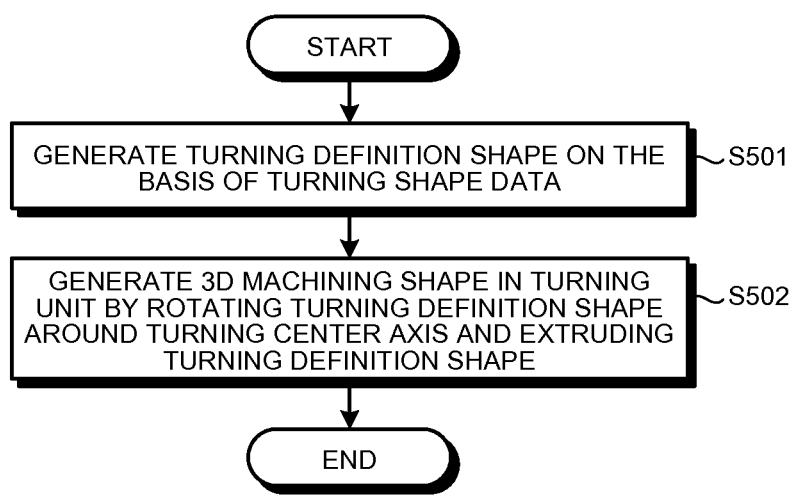
FIG. 13 is a flowchart for explaining a processing procedure in which the 3D-machining-shape generating unit generates a 3D machining shape in a unit of turning.

FIG. 13 is a flowchart for explaining a processing procedure in which the 3D-machining-shape generating unit 7 generates a 3D machining shape in a unit of turning. First, the 3D-machining-shape generating unit 7 generates a turning definition shape on the basis of turning shape data (step S501). The turning definition shape is generated, for example, as explained below. A wire shape of a closed loop shape including incision points set in turning instruction data and a track set in the turning shape data is generated. The incision points and the track are interpolated by the wire shape. For the interpolation, for example, the shape of a cross section of a material shape is used. The generated wire shape corresponds to the turning definition shape. Because the incision points and the track include position information, the turning definition shape generated by the processing at step S501 includes position information.

Subsequently, the 3D-machining-shape generating unit 7 rotates the turning definition shape by 360 degrees around a turning center axis and extrudes the turning definition shape to thereby generate a 3D machining shape in the turning unit (step S502). Consequently, the generation of the 3D machining shape in a unit of surface machining is completed.

Position information decided by the processing at step S501 is incidental to the generated 3D machining shape in a unit of surface machining.

Figure 14:
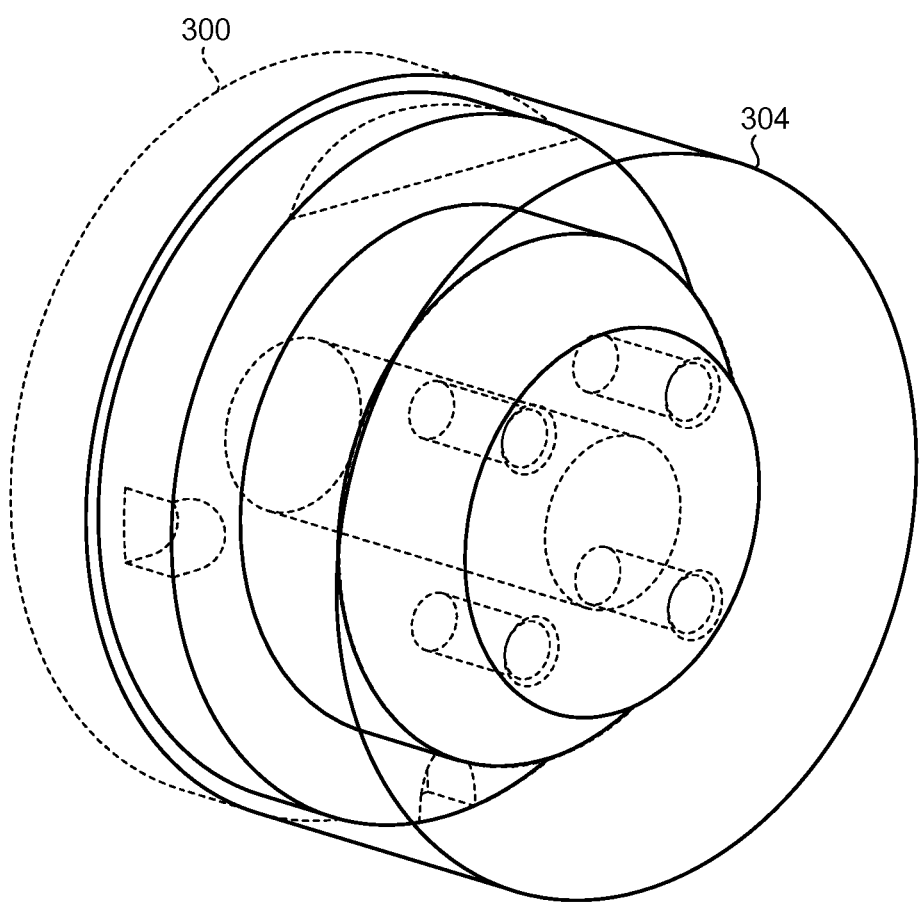
FIG. 14 is a diagram showing a 3D machining shape defined by units of turning of a unit number #3.

FIG. 14 is a diagram showing an example of a 3D machining shape in a unit of turning. A shape indicated by a solid line is a 3D machining shape in a unit of turning of the unit number #4.

In this way, the 3D-machining-shape generating unit 7 can generate the 3D machining shape on the basis of the machining data described in a unit of machining.

The processing at step S103 is explained more in detail.

Figure 15:
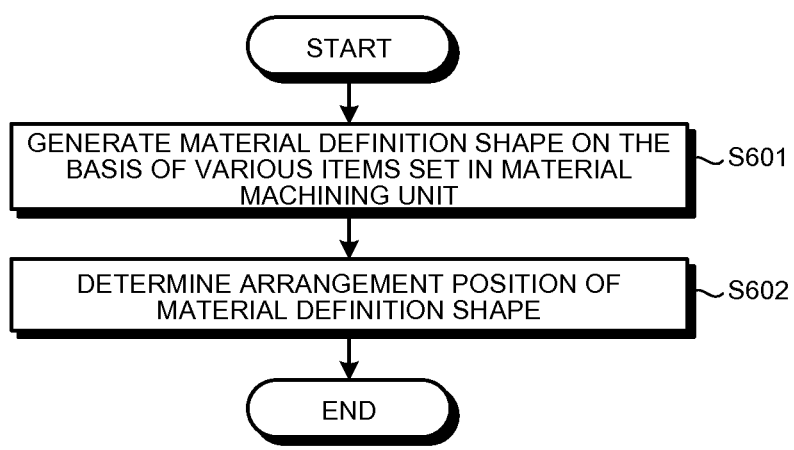
FIG. 15 is a flowchart for explaining a processing procedure in which a 3D-finished-shape generating unit generates a material shape.

FIG. 15 is a flowchart for explaining the processing at step S103, that is, a processing procedure in which the 3D-finished-shape generating unit 8 generates a material shape. First, the 3D-finished-shape generating unit 8 generates a material definition shape on the basis of a material outer diameter set in the "material outer diameter" item, a material inner diameter set in the "material inner diameter" item, and material length set in the "material length" item in the material machining unit (step S601).

The material definition shape is generated, for example, as explained below. A solid model of a column having the material outer diameter as a diameter and having the material length as length in the axial direction is generated. A solid mode of a column having the material inner diameter as a diameter and having the material length as length in the axial direction is generated. A difference operation for excluding the solid model of the column having the material inner diameter as the diameter from the solid model of the column having the material outer diameter as the diameter is executed, whereby a material definition shape is generated.

Subsequently, the 3D-finished-shape generating unit 8 determines an arrangement position of the material definition shape (step S602). Specifically, for example, when it is assumed that the Z axis is a turning center axis, the material definition shape is arranged such that a column center axis of the material definition shape and the Z axis coincide with each other. An end face of the material definition shape is translated in the −Z-axis direction such that the length of an extruding section from the work origin position coincides with material end face length set in the "material end face length" item. Consequently, the generation of the material shape is completed. The position information decided by the processing at step S602 is incidental to the generated material shape.

Figure 16:
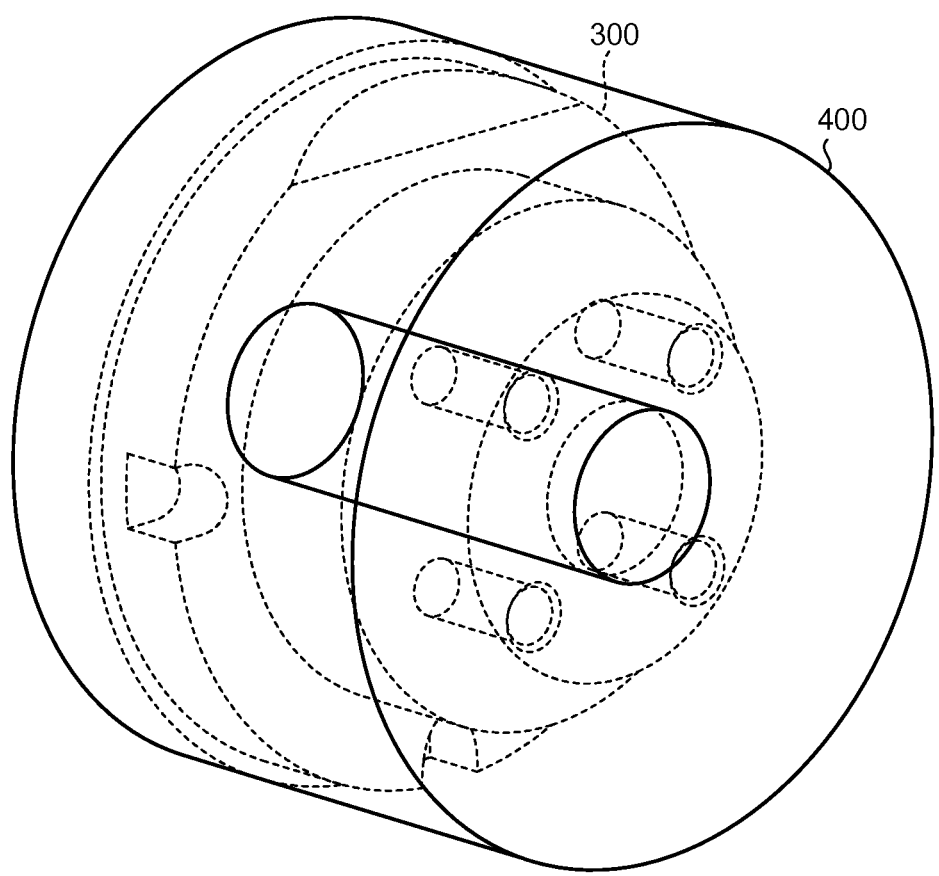
FIG. 16 is a diagram showing an example of the material shape.

FIG. 16 is a diagram showing an example of a material shape. A shape 400 indicated by a solid line is a material shape set by the material machining unit of the unit number #0.

Processing for displaying the dimension data in the processing at step S106 by the display-screen control unit 11 is explained in detail.

When the dimension data indicates a coordinate value, the display-screen control unit 11 converts the dimension data into text information. The display-screen control unit 11 projects a point indicated by position information attached to the dimension data on a two-dimensional plane configuring the shape display screen 202. In the vicinity of a position on which the point is projected, the display-screen control unit 11 displays text information of the point on the two-dimensional plane of the shape display screen 202.

Figure 17:
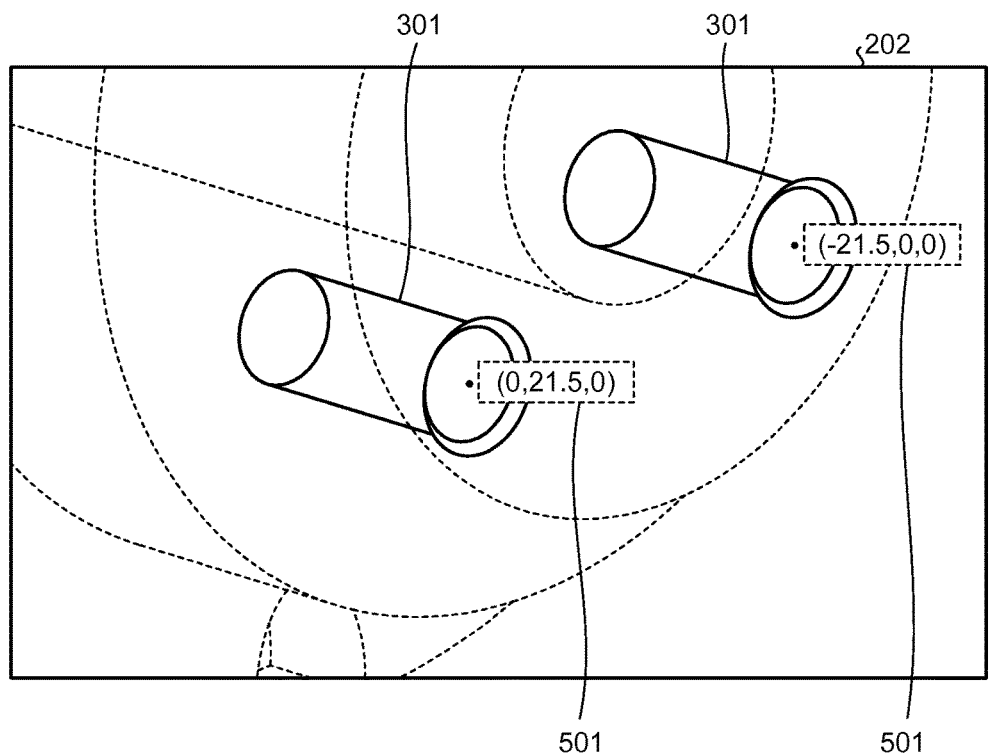
FIG. 17 is a diagram showing a display example of a position of a 3D machining shape in a unit of hole machining.

FIG. 17 is a diagram showing a display example of a 3D machining shape in a unit of hole machining. On the shape display screen 202, coordinate values indicating positions of holes set in the "coordinate value" item, which is one of items configuring the shape instruction data, are displayed (text information 501). Note that coordinate values set in the "coordinate value" item are associated with dimension data, on which the text information 501 is based, as position information. Points are displayed in positions indicated by the position information. The text information 501 is displayed such that points coincide with left corner portions of the text information 501.

Figure 18:
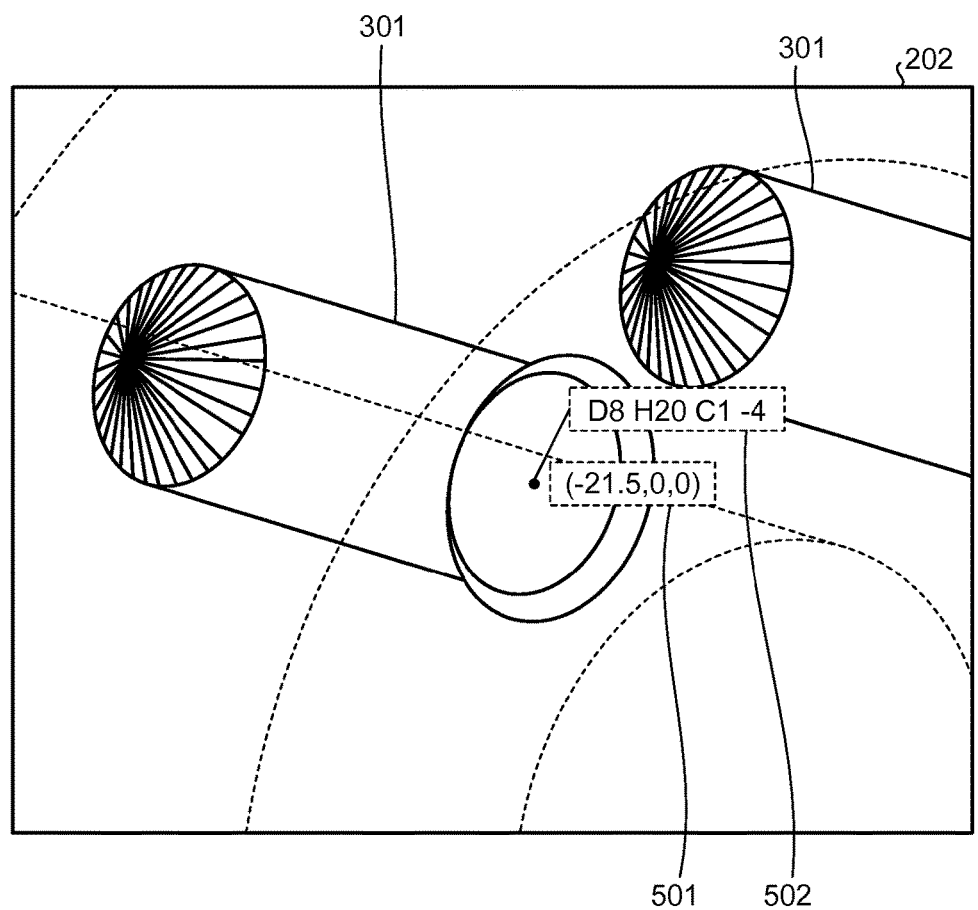
FIG. 18 is a diagram showing a display example of dimensions of a 3D machining shape in a unit of hole machining.

FIG. 18 is a diagram showing a display example of a dimension of a 3D machining shape in a unit of hole machining. On the shape display screen 202, values respectively set in the "hole diameter" item, the "hole depth" item, and the "chamfering" item and the number of holes are displayed (text information 502). The number of holes is equal to the number of machining positions set in the shape instruction data. Note that a coordinate value set in the "coordinate value" item is associated with dimension data, on which the text information 502 is based, as position information. A point is displayed in a position indicated by the position information. A leadout line is displayed in a right obliquely upward direction from the point. The text information 502 is displayed such that the distal end of the leadout line coincides with a left corner portion of the text information 502.

Note that the attribute processing unit 10 adds prefixes corresponding to items of extraction sources to the tops of the extracted dimension data. A prefix "D" is attached to the value set in the "hole diameter" item of a unit of hole machining, a prefix "H" is attached to the value set in the "hole depth" item, a prefix "C" is attached to the value set in the "chamfering" item, and a prefix "-" is attached to the value indicating the number of holes.

It is optional whether a leadout line is drawn out from the point indicated by the position information. For example, the attribute processing unit 10 attaches an instruction to use the leadout line to the dimension data. Whether the instruction to use the leadout line is attached to the dimension data is set in advance, for example, for each of the items. When the instruction to use the leadout line is attached to the dimension data, the display-screen control unit 11 displays the leadout line.

Figure 19:
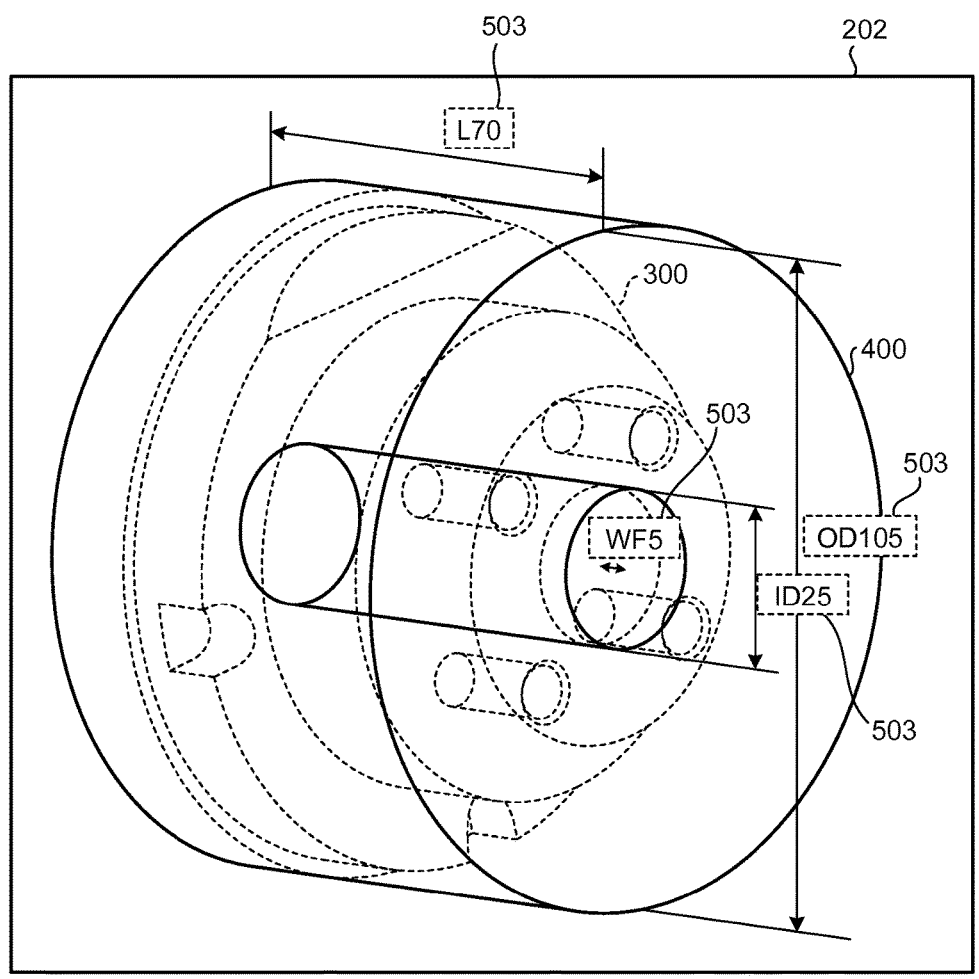
FIG. 19 is a diagram showing a display example of dimensions of the material shape.

FIG. 19 is a diagram showing a display example of dimensions of a material shape. On the shape display screen 202, values respectively set in the "material outer diameter" item, the "material inner diameter" item, the "material length" item, and the "material end face length" item are displayed (text information 503). A prefix "OD" is attached to the value set in the "material outer diameter" of the material machining unit. A prefix "ID" is attached to the value set in the "material inner diameter" item. A prefix "L" is attached to the value set in the "material length" item. A prefix "WF" is attached to the value set in the "material end face length" item. Dimension data, on which the text information 503 is based, respectively includes, for example, draw-out positions of two leadout lines as position information. The leadout lines starting from the two draw-out positions are respectively displayed. A dimension line in a shape having arrows on both sides is displayed between the leadout lines. Text information 503 is displayed in predetermined positions in the vicinity of the arrows in both directions.

As explained above, when displaying the length, the display-screen control unit 11 can render the two leadout lines and the arrows in both directions. For example, the attribute processing unit 10 attaches an instruction to use the two leadout lines and the arrows in both directions to the dimension data. The attribute processing unit 10 sets the draw-out positions of the leadout lines and the display positions of the text information 503 as position information of the dimension data. The display-screen control unit 11 displays the leadout lines, the arrows in both directions, and the text information 503 on the basis of the position information given to the dimension data and an instruction.

Figure 20:
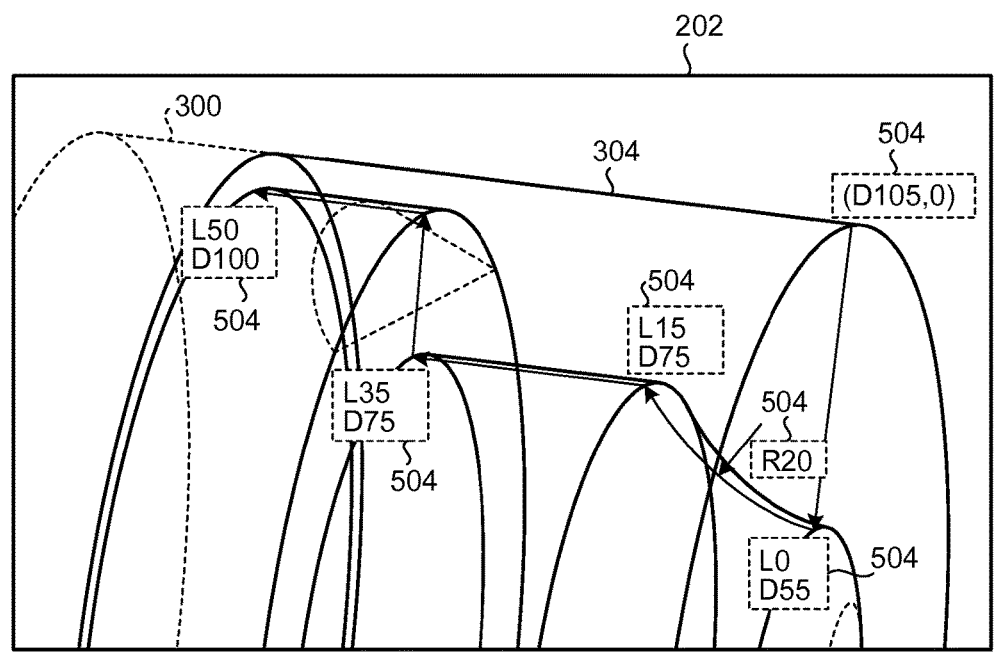
FIG. 20 is a diagram showing a display example of dimensions of a 3D machining shape in a unit of turning.

FIG. 20 is a diagram showing a display example of dimensions of a 3D machining shape in a unit of turning. On the shape display screen 202, coordinate values of incision points set in an "incision-X" item and an "incision-Z" item and values for each of elements set in the "start point coordinate" item, the "end point coordinate" item, and the "radius R" item are displayed (text information 504). A prefix "D" is attached to the value set in the "incision-X" item of a unit of turning. A prefix "R" is attached to the value set in the "radius R" item. A prefix "L" is attached to the value set in the "start point-Z" item or the "end point-Z" item. A prefix "D" is attached to the value set in a "start point-X" item or an "end point-X" item. On the shape display screen 202, elements of tracks are displayed using arrows directed from start point coordinates to end point coordinates.

Figure 21:
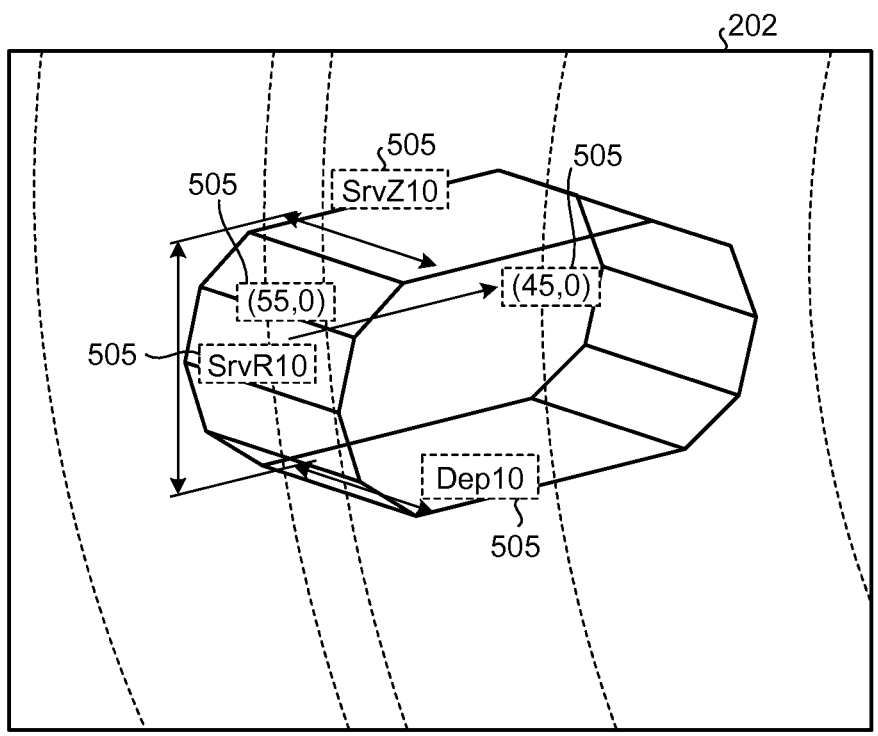
FIG. 21 is a diagram showing a display example of dimensions of a 3D machining shape in a unit of line machining.

FIG. 21 is a diagram showing a display example of dimensions of a 3D machining shape in a unit of line machining. On the shape display screen 202, values respectively set in the "depth" item, the "margin-Z" item, and the "margin-R" item and values for each of elements set in the "start point coordinate" item and the "end point coordinate" item are displayed (text information 505). A prefix "SrvZ" is attached to the value set in the "margin-Z" item of a unit of line machining. A prefix "SrvR" is attached to the value set in the "margin-R" item. A prefix "Dep" is attached to the value set in the "depth" item. When an element of a track is an arc, the value set in the "radius R" item is displayed. On the shape display screen 202, elements of tracks are displayed using arrows directed from start point coordinates to end point coordinates.

Figure 22:
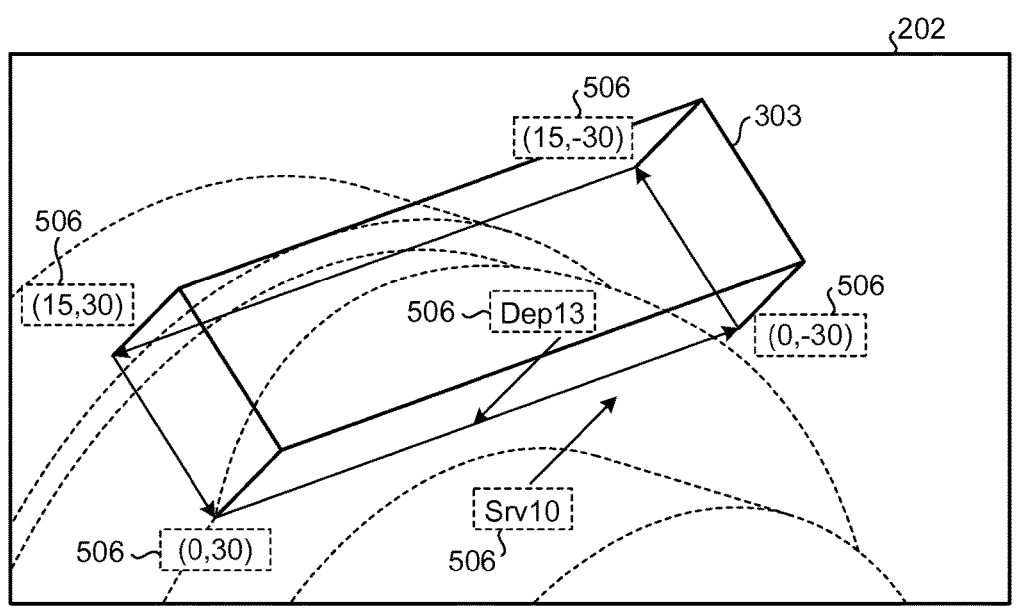
FIG. 22 is a diagram showing a display example of dimensions of a 3D machining shape in a unit of surface machining.

FIG. 22 is a diagram showing a display example of dimensions of a 3D machining shape in a unit of surface machining. On the shape display screen 202, values respectively set in the "depth" item and the "margin-Z" item and values for each of elements set in the "start point coordinate" item and the "end point coordinate" item are displayed (text information 506). A prefix "Dep" is attached to the value set in the "depth" item of a unit of surface machining. A prefix "Srv" is attached to the value set in the "margin-Z" item. When an element of a track is an arc, the value set in the "radius R" item is displayed. On the shape display screen 202, shapes of elements defining a machining surface are displayed using arrows directed from start point coordinates to end point coordinates.

As explained above, when a unit of machining includes the items for setting the start point coordinates and the end point coordinates (e.g., items for setting tracks of a tool), the display-screen control unit 11 displays the elements using the arrows directed from the start point coordinates to the end point coordinates. For example, the attribute processing unit 10 generates an arrow display instruction including shapes of the elements of the start point coordinates and the end point coordinates for each of the elements of the tracks and an instruction to display arrows on the basis of the items corresponding thereto. The display-screen control unit 11 displays the shapes of the elements on the basis of the arrow display instruction.

The display-screen control unit 11 can receive an input for editing the NC program via the program display screen 201. Specifically, the display-screen control unit 11 can receive an input of a value via the instruction input unit 3 in a state in which a desired item is selected in the NC program displayed on the program display screen 201. The display-screen control unit 11 can update, with the input value, a setting value of the selected item in the NC program stored in the program storing unit 6. Note that a unit selectable in the NC program being displayed on the program display screen 201 is not limited to only an item unit. In a state in which an item is selected on the program display screen 201, the display-screen control unit 11 can highlight dimension data or a 3D shape corresponding to the selected item on the shape display screen 202.

Figure 23:
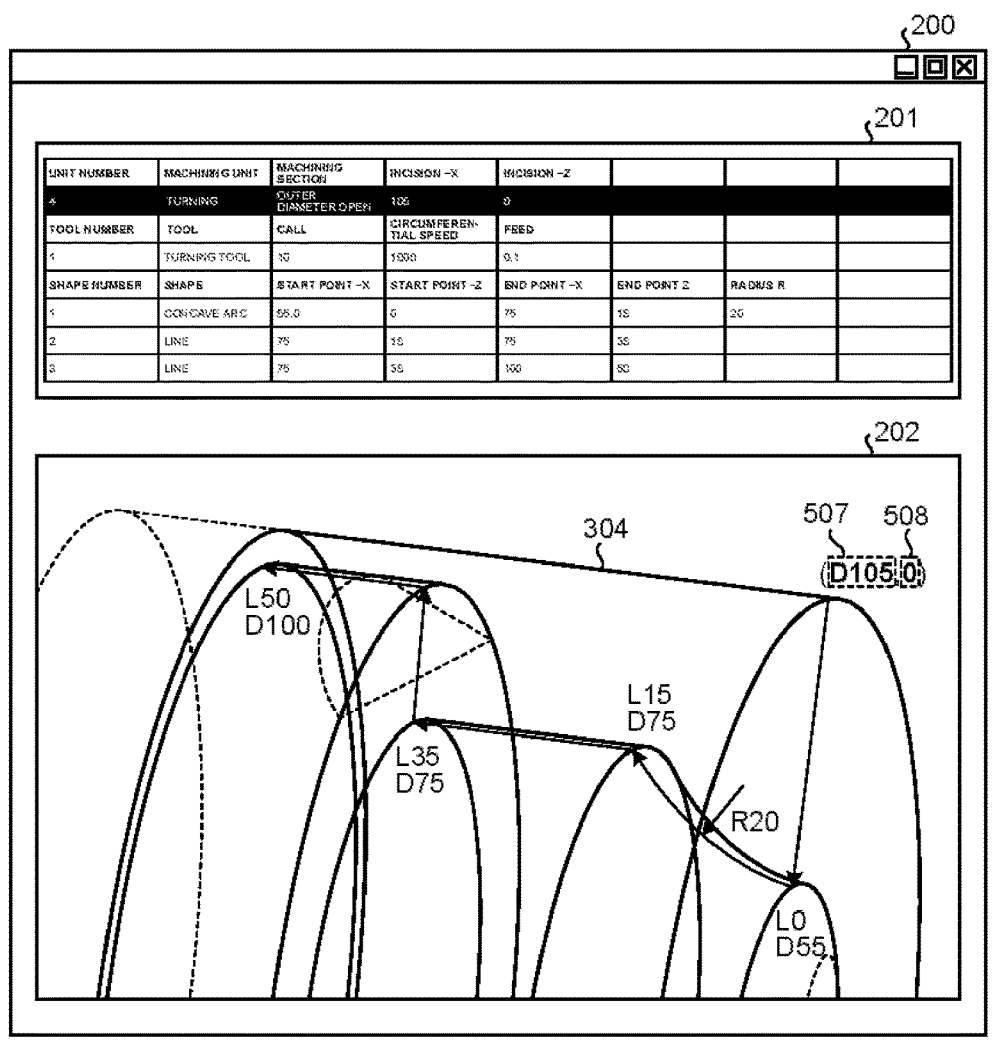
FIG. 23 is a diagram showing a display example of a state in which turning instruction data is selected.

FIG. 23 is a diagram showing a display example of a state in which turning instruction data is selected. As shown in the figure, text information 507 for displaying a value set in an "incision-X" item and text information 508 for displaying a value set in an "incision-Z" item are highlighted by bold letters.

Figure 24:
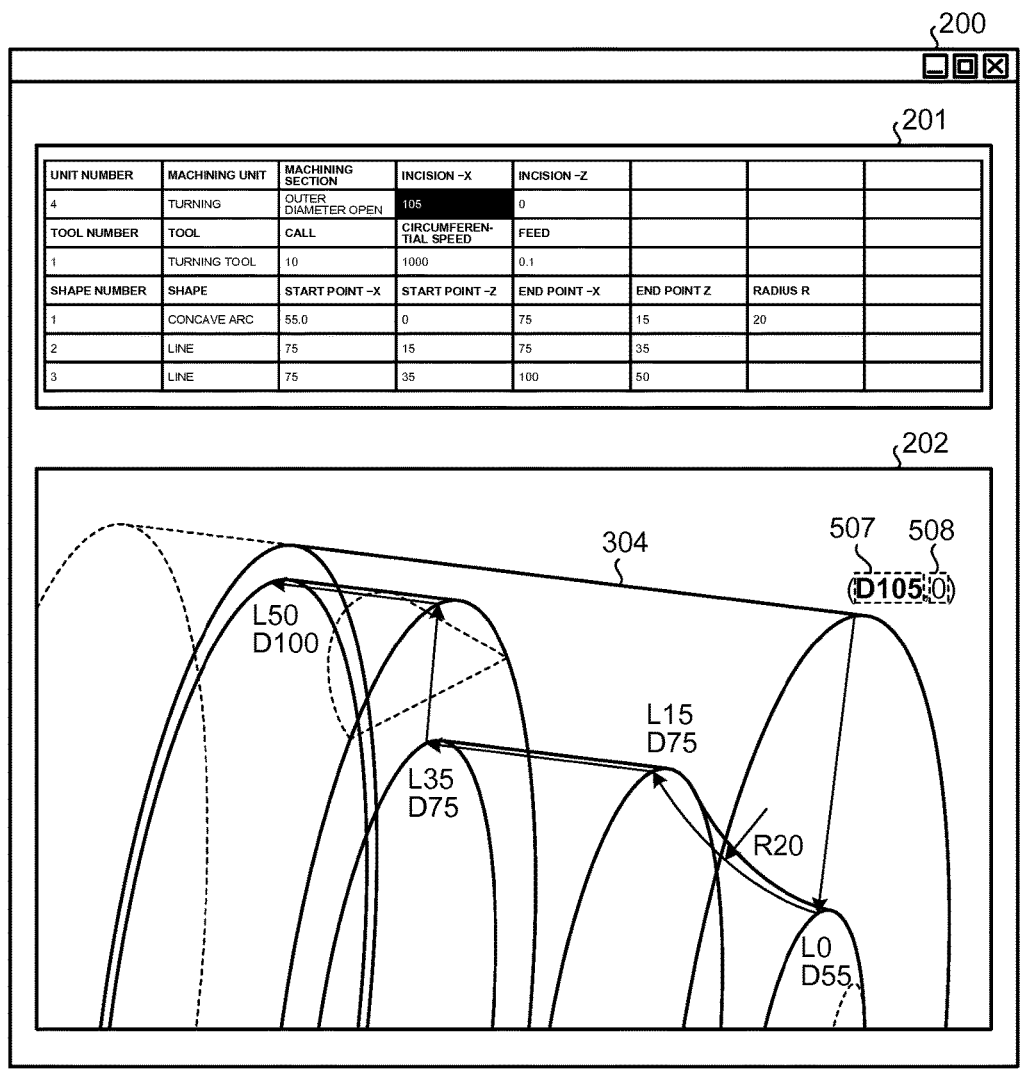
FIG. 24 is a diagram showing a display example of a state in which an "incision-X" item in the turning instruction data is selected.

FIG. 24 is a diagram showing a display example of a state in which an "incision-X" item in the turning instruction data is selected. As shown in the figure, the text information 507 for displaying a value set in the "incision-X" item is highlighted by a bold letter. Note that, because the "incision-Z" item is not selected, the text information 508 corresponding to the "incision-Z" item is not highlighted.

Figure 25:
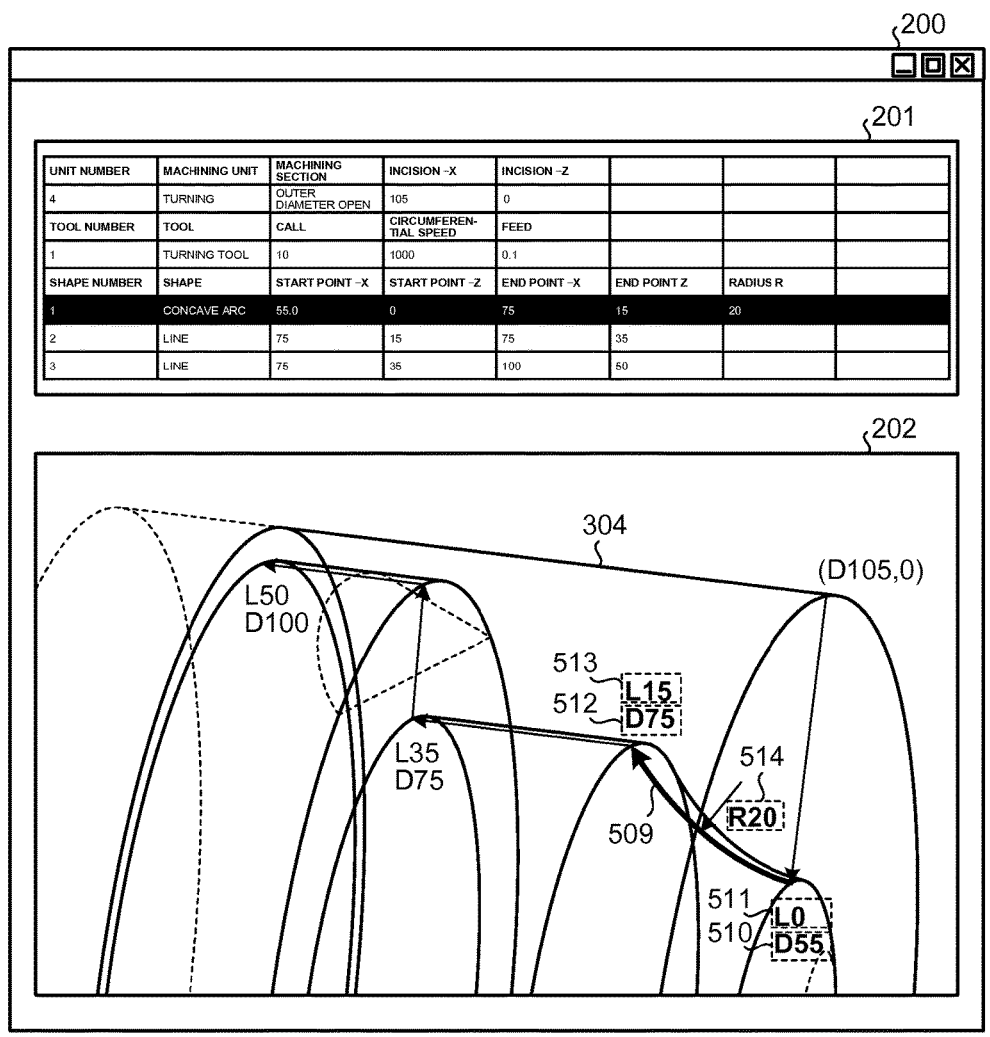
FIG. 25 is a diagram showing a display example of a state in which one of elements of a track is selected.

FIG. 25 is a diagram showing a display example of a state in which one of elements of tracks is selected. An element having an arcuate shape is selected. As shown in the figure, an arrow 509 having an arcuate shape corresponding to the selected element is highlighted by a thick line. Text information 510 indicating a value set in a "start point-X" item configuring a "start point coordinate" item, text information 511 indicating a value set in a "start point-Z" item configuring the "start point coordinate" item, text information 512 indicating a value set in an "end point-X" item configuring an "end point coordinate" item, text information 513 indicating a value set in an "end point-Z" item configuring the "end point coordinate" item, and text information 514 indicating a value set in a "radius R" item are highlighted by bold letters.

Figure 26:
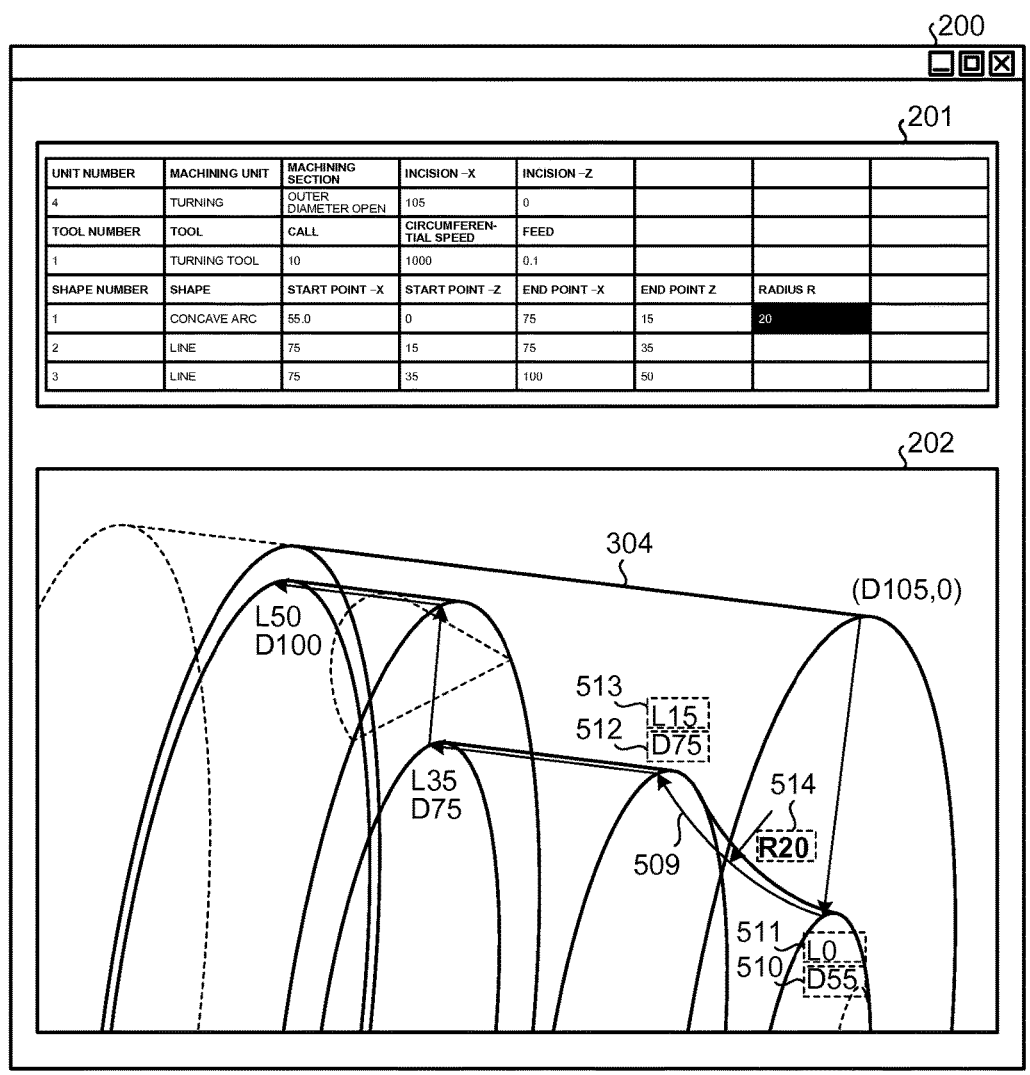
FIG. 26 is a diagram showing a display example of a state in which a "radius R" item among items for setting the elements of the track is selected.

FIG. 26 is a diagram showing a display example of a state in which a "radius R" item among items for setting elements of tracks is selected. As shown in the figure, text information indicating a value set in the "radius R" item is highlighted by a bold letter. Text information (text information 510 to 513) corresponding to unselected items and the arrow 509 are not highlighted.

Note that a method of highlighting is not limited to the display by a bold letter or a thick line. A method of displaying a part using a specific color different from other parts or blinking the part can also be adopted as the method of highlighting.

When a unit of machining being displayed on the program display screen 201 is selected (including when instruction date or an item is selected), the display-screen control unit 11 can display, on the shape display screen 202, a coordinate object indicating a work coordinate system on which a 3D shape of the selected machining unit is based. For example, the attribute processing unit 10 generates, on the basis of a machining surface angle machining unit and a basic coordinate movement machining unit immediately preceding the selected machining unit, position information of the work coordinate origin and direction information (work coordinate information) of coordinate axes configuring a work coordinate. The display-screen control unit 11 displays a coordinate object in a position indicated by the information related to the work coordinate system generated by the attribute processing unit 10 such that the directions of the coordinate axes coincide with directions indicated by the direction information.

Figure 27:
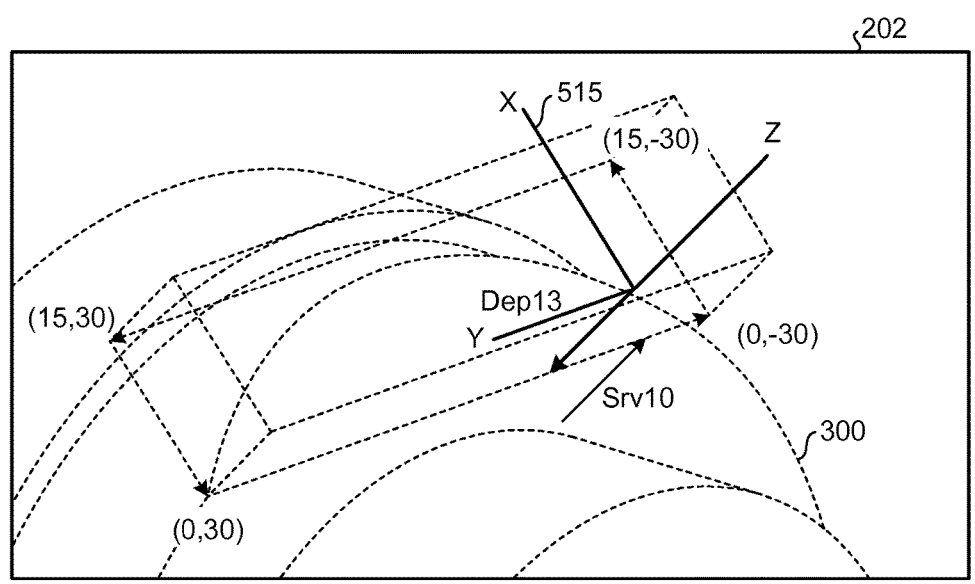
FIG. 27 is a diagram showing a display example of a coordinate object displayed when a unit of surface machining of a unit number #7 is selected.

FIG. 27 is a diagram showing a display example of a coordinate object displayed when a unit of surface machining of the unit number #7 is selected. A coordinate object 515 is displayed in a position based on a unit of machining of a unit number #5, which is a machining surface angle machining unit immediately preceding unit of surface machining of the unit number #7, and a unit of machining of a unit number #6, which is a basic coordinate movement machining unit immediately preceding unit of surface machining of the unit number #7. Specifically, the coordinate object 515 is displayed to in a form in which the coordinate object 515 faces a direction rotated 45 degrees counterclockwise around a +Y axis according to a setting value "45" of an "angle B" item of a unit of machining of the unit number #5 and in a form in which the work coordinate origin coincides with a position moved in the X-axis direction by 50 and moved in the Z-axis direction by −25 according to a setting value "50" of a "movement X" item and a setting value "−25" of a "movement Z" item of a unit of machining of the unit number #6.

The display-screen control unit 11 can be configured to be capable of changing a scale of the shape display screen 202 on the basis of, for example, an instruction from the operator. When plural kinds of text information are displayed in a manner overlapped with one another, the display-screen control unit 11 does not have to display text information related to an item having a low priority degree displayed to overlap text information related to an item having a high priority degree. For example, priority degrees are set for each of items in advance by the operator.

Figure 28:
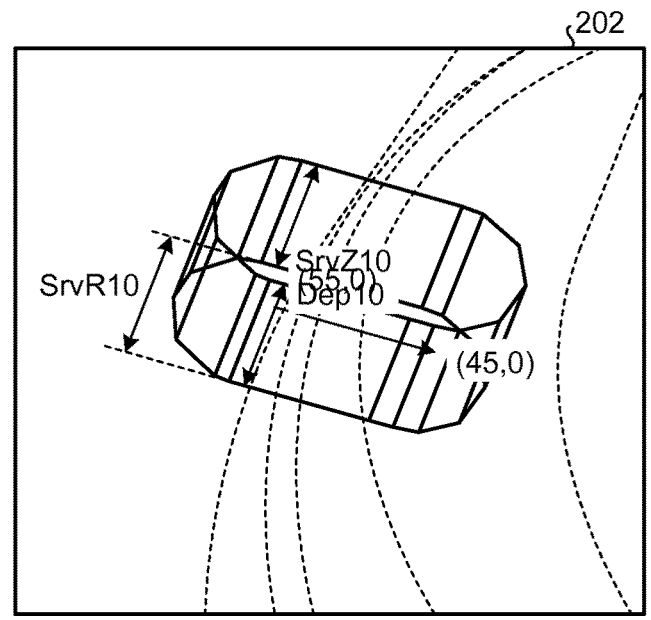
FIG. 28 is a diagram showing another display example of dimensions of a 3D machining shape in a unit of line machining.
Figure 29:
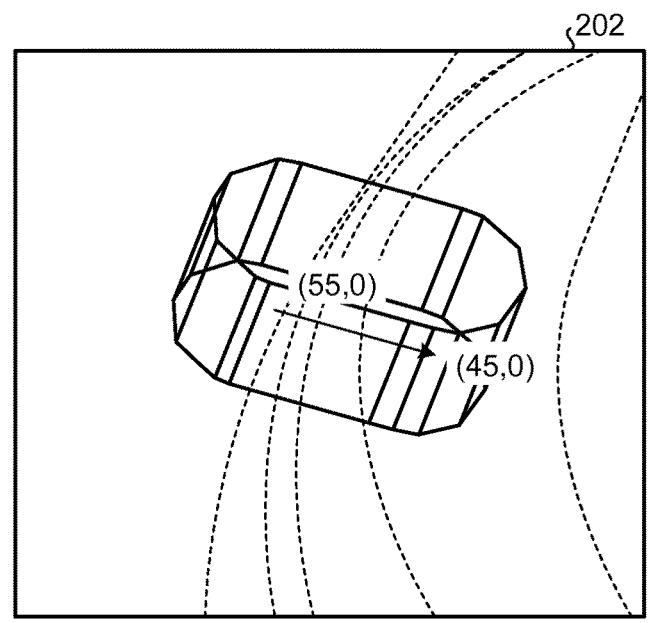
FIG. 29 is a diagram showing a display example of dimensions of a 3D machining shape in a unit of line machining displayed when respective priority degrees of a "depth" item, a "margin-Z" item, and a "margin-R" item are set lower than priority degrees of a "start point coordinate" item and an "end point coordinate" item.

FIG. 28 is a diagram showing another display example of dimensions of a 3D machining shape in a unit of line machining. As shown in the figure, various kinds of text information are displayed in a manner overlapped with one another together with the 3D machining shape in a unit of line machining. FIG. 29 is a diagram showing a display example of dimensions of a 3D machining shape in a unit of line machining displayed when respective priority degrees of a "depth" item, a "margin-Z" item, and a "margin-R" item are set lower than priority degrees of a "start point coordinate" item and an "end point coordinate" item. As shown in the figure, values set in the "start point coordinate" item and the "end point coordinate" item are displayed. Text information set in the "depth" item, the "margin-Z" item, and the "margin-R" item is not displayed.

Figure 30:
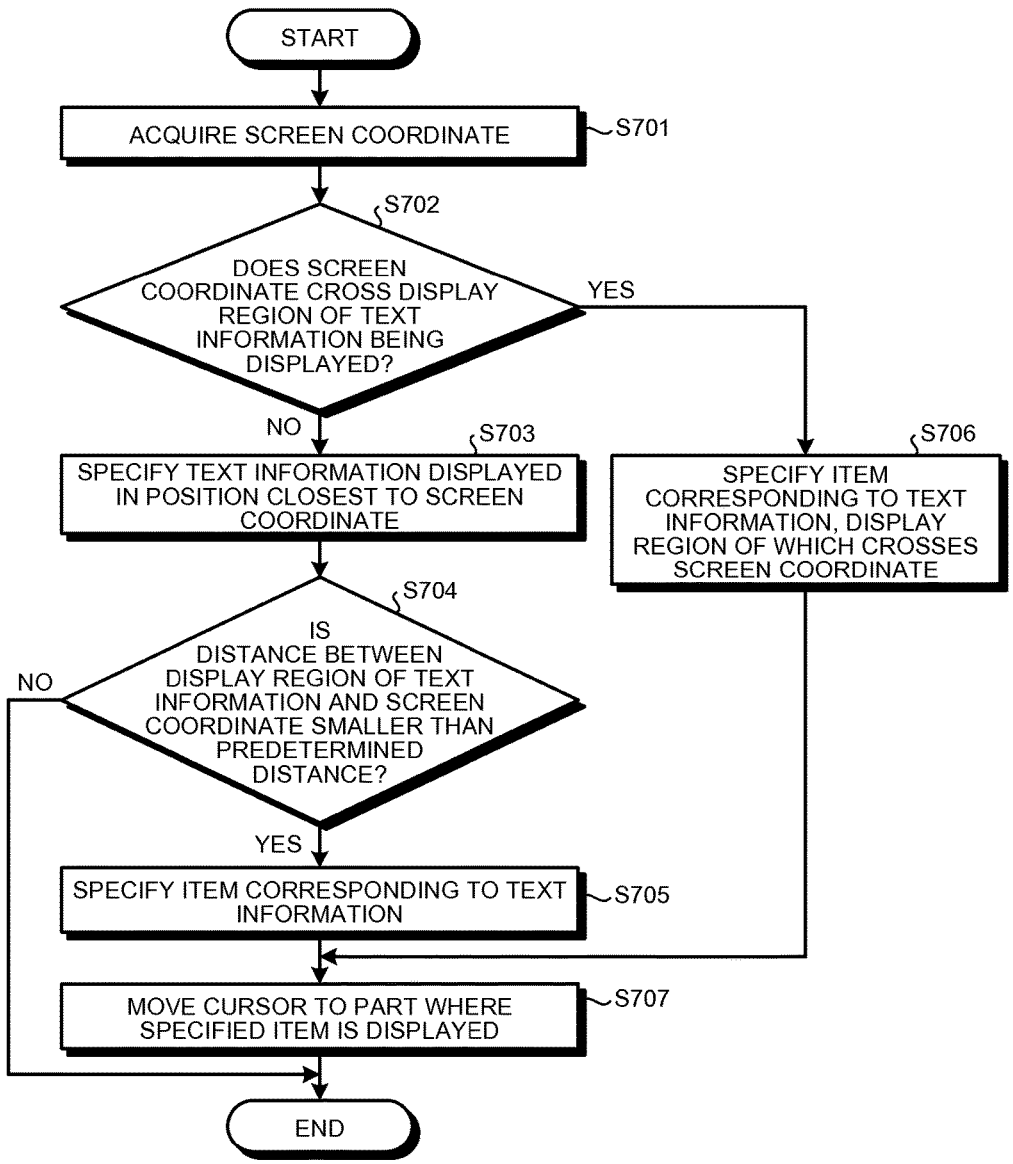
FIG. 30 is a flowchart for explaining the operation of a display-screen control unit performed when an operator selects text information displayed on a shape display screen.

FIG. 30 is a flowchart for explaining the operation of the display-screen control unit 11 performed when the operator selects text information displayed on the shape display screen 202. When the operator clicks the mouse on the shape display screen 202, a screen coordinate in a clicked position is detected by the interactive-operation processing unit 1. The display-screen control unit 11 acquires the screen coordinate detected by the interactive-operation processing unit 1 (step S701). The display-screen control unit 11 determines whether the acquired screen coordinate crosses a display region of the text information being displayed (step S702). When the screen coordinate does not cross the display region of the text information (No at step S702), the display-screen control unit 11 specifies text information displayed in a position closest to the screen coordinate (step S703) and determines whether a distance between the display region of the specified text information and the screen coordinate is smaller than a predetermined distance (step S704).

When the distance between the display region of the text information specified by the processing at step S703 and the screen coordinate is larger than the predetermined distance (No at step S704), the display-screen control unit 11 ends the processing. When the distance between the display region of the text information specified by the processing at step S703 and the screen coordinate is smaller than the predetermined distance (Yes at step S704), the display-screen control unit 11 specifies an item corresponding to the text information specified by the processing at step S703 among items configuring the NC program (step S705).

When the screen coordinate crosses the display region of the text information (Yes at step S702), the display-screen control unit 11 specifies an item corresponding to the text information, the display region of which crosses the screen coordinate, among the items configuring the NC program (step S706).

After the processing at step S705 or step S706, the display-screen control unit 11 moves the cursor to a part where the item specified by the processing at step S705 and step S706 is displayed on the program display screen 201 (step S707) and ends the processing.

Figure 31:
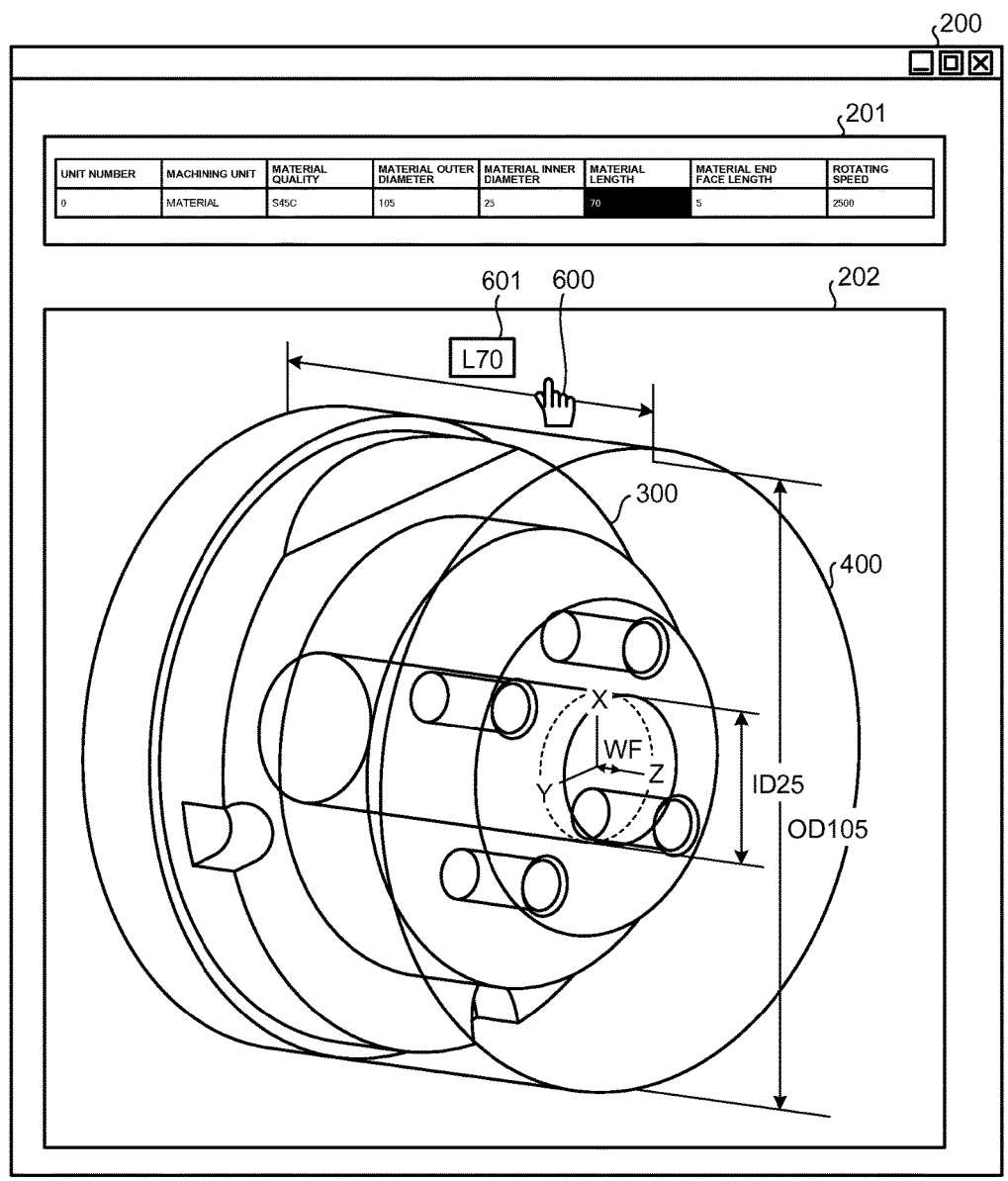
FIG. 31 is a diagram showing a display example displayed when the text information is selected.

FIG. 31 is a diagram showing a display example displayed when text information is selected. According to clicking of the mouse in a state in which a mouse cursor 600 is placed in the vicinity of a display region 601 where material length among dimensions of a material shape is displayed, the cursor is displayed in a "material length" item included in the material machining unit. Note that it is assumed that a highlighted state is the state in which the cursor is placed.

The display-screen control unit 11 can receive an editing input for creating a unit of machining anew. In a transient state until items are set when a unit of machining is created anew, "***" indicating that the items are not set is displayed as dimension data. The attribute processing unit 10 associates position information of an initial value decided in advance with the dimension data.

Figure 32:
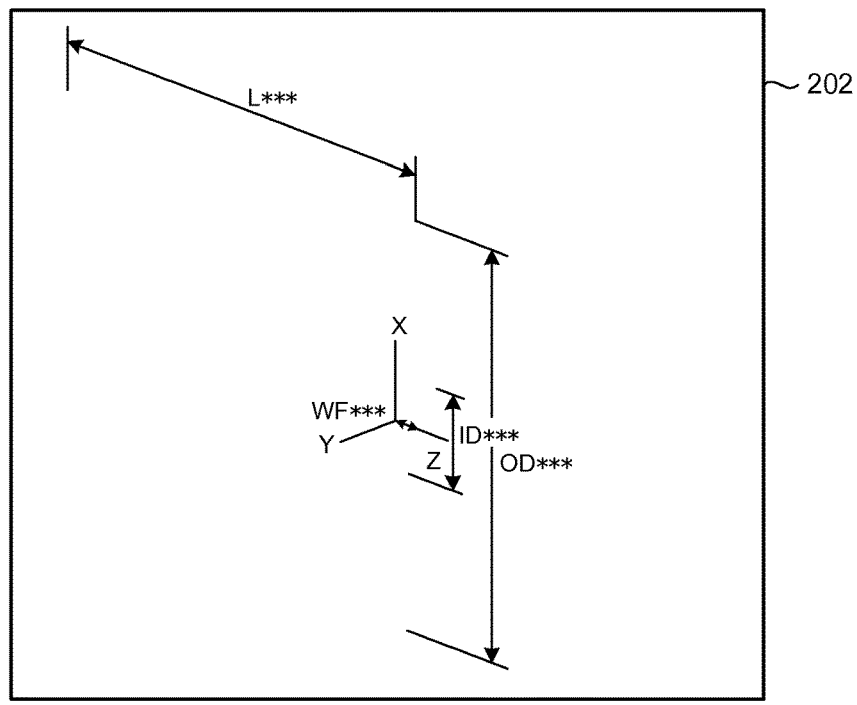
FIG. 32 is a diagram showing a display example of the shape display screen that displays a unit of material machining in a state in which all items are not set.

FIG. 32 is a diagram showing a display example of the shape display screen 202 on which a material machining unit in a state in which all items are not set is displayed. As shown in the figure, "***" is displayed in text information related to dimensions. In this state, a material shape is not displayed yet.

Figure 33:
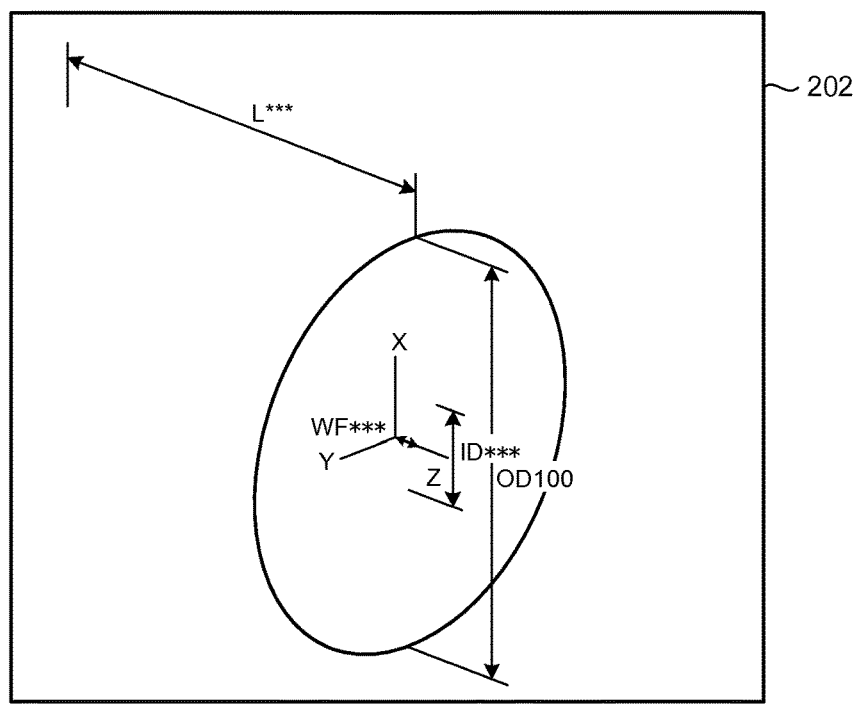
FIG. 33 is a diagram showing a display example of the shape display screen displayed when a "material outer diameter" item is set from the state shown in FIG. 32.

FIG. 33 is a diagram showing a display example of the shape display screen 202 displayed when a "material outer diameter" item is set from the state shown in FIG. 32. When the "material outer diameter" item is set, a disc having the set material outer diameter as a diameter is displayed.

Figure 34:
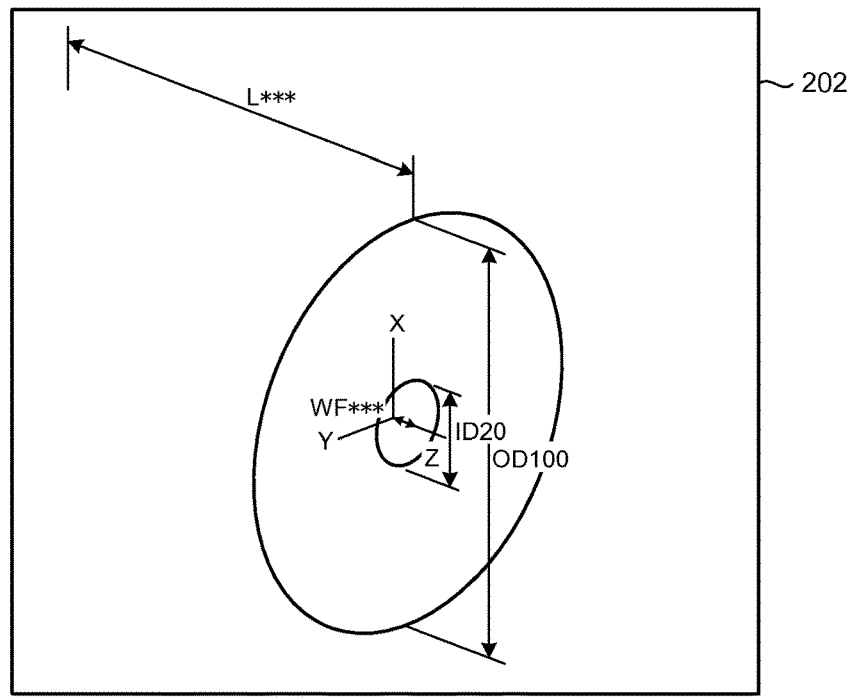
FIG. 34 is a diagram showing a display example of the shape display screen displayed when a "material inner diameter" item is set from a state shown in FIG. 33.

FIG. 34 is a diagram showing a display example of the shape display screen 202 displayed when a "material inner diameter" item is set from a state shown in FIG. 33. When the "material inner diameter" item is set, a disc obtained by subtracting a disc having the material inner diameter as a diameter from the disc having the material outer diameter as the diameter is displayed.

Figure 35:
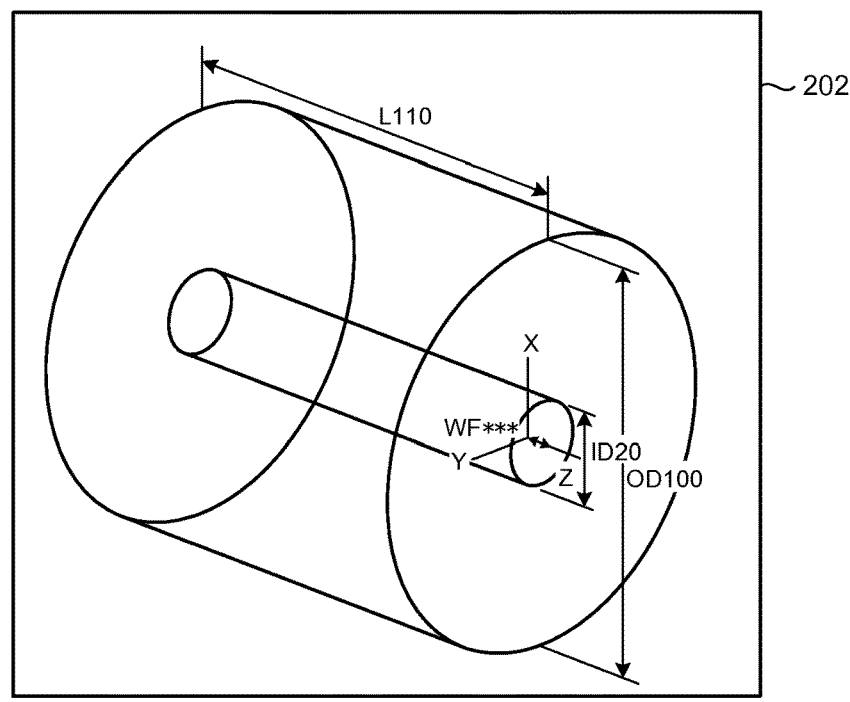
FIG. 35 is a diagram showing a display example of the shape display screen displayed when a "material length" item is selected from a state shown in FIG. 34.

FIG. 35 is a diagram showing a display example of the shape display screen 202 displayed when a "material length" item is set from the state shown in FIG. 34. When the "material length" item is set, a shape obtained by extruding, by the set material length, the disc obtained by subtracting the disc having the material inner diameter as a diameter from the disc having the material outer diameter as the diameter is displayed.

Figure 36:
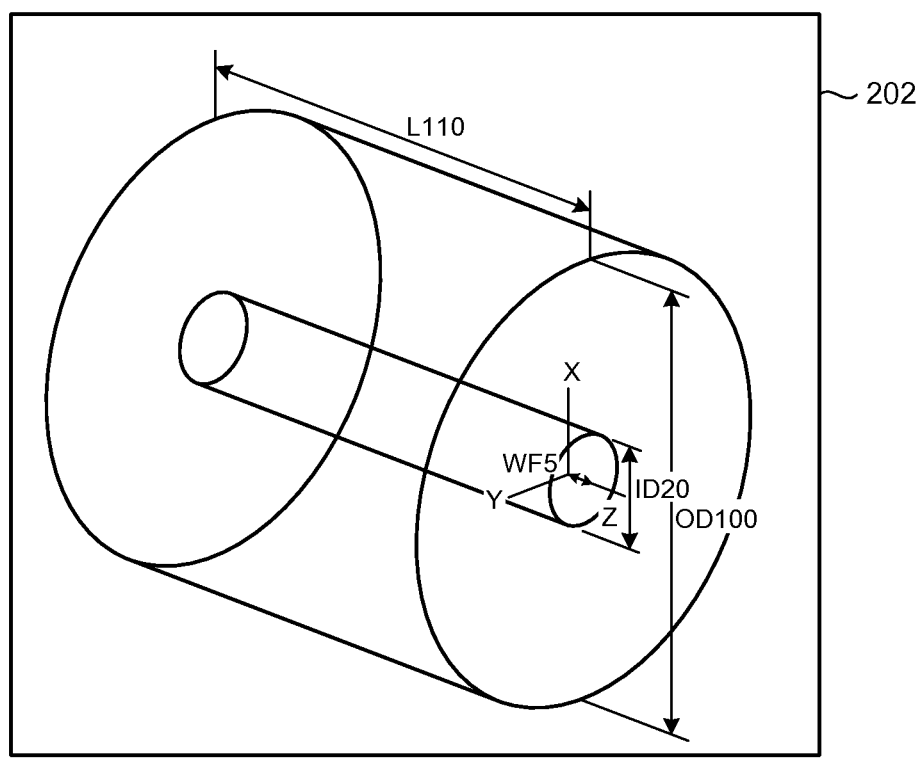
FIG. 36 is a diagram showing a display example of the shape display screen displayed when a "material end face length" item is set from a state shown in FIG. 35.

FIG. 36 is a diagram showing a display example of the shape display screen 202 displayed when a "material end face length" item is set from the state shown in FIG. 35. When the "material end face length" item is set, the shape shown in FIG. 35 is moved and displayed such that the length of a portion protruded from the work origin position coincides with a material end face length.

Figure 37:
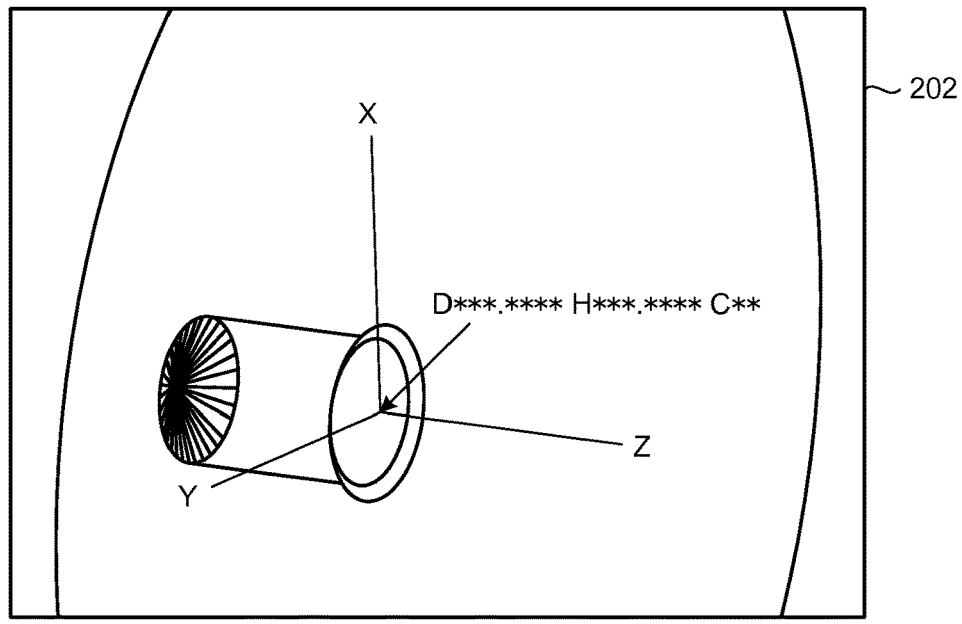
FIG. 37 is a diagram showing a display example of the shape display screen that displays a unit of drilling in a state in which all items are not set.

FIG. 37 is a diagram showing a display example of the shape display screen 202 on which a drilling unit in a state in which all items are not set is displayed. As shown in the figure, "***" is displayed in text information related to dimensions. In this state, a 3D machining shape in a unit of hole machining generated using initial values is displayed.

Figure 38:
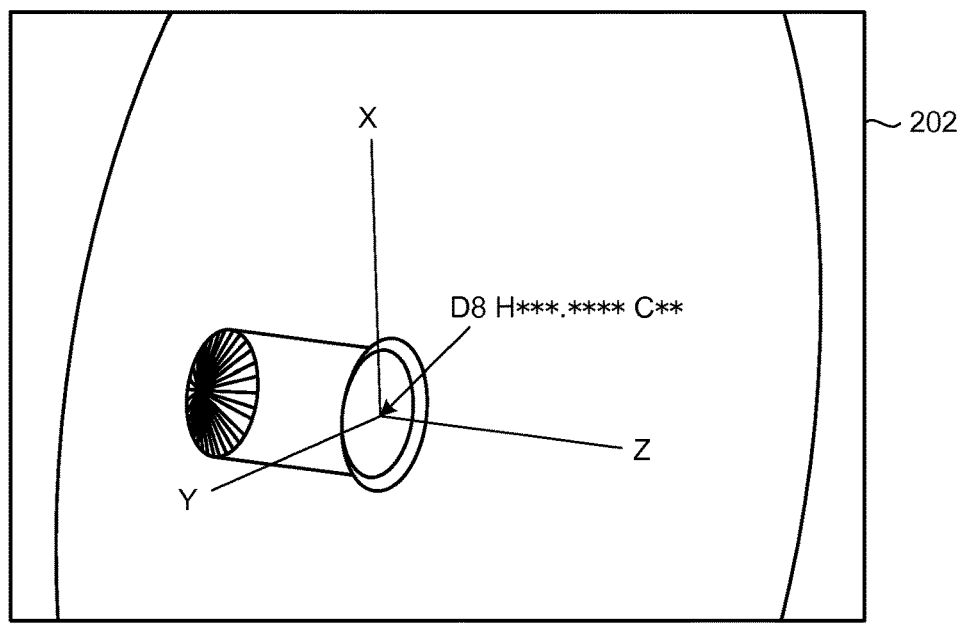
FIG. 38 is a diagram showing a display example of the shape display screen displayed when a "hole diameter" item is set from a state shown in FIG. 37.

FIG. 38 is a diagram showing a display example of the shape display screen 202 displayed when a "hole diameter" item is set from the state shown in FIG. 37. When the "hole diameter" item is set, a 3D machining shape is displayed in which the diameter of a hole is changed according to a set hole diameter.

Figure 39:
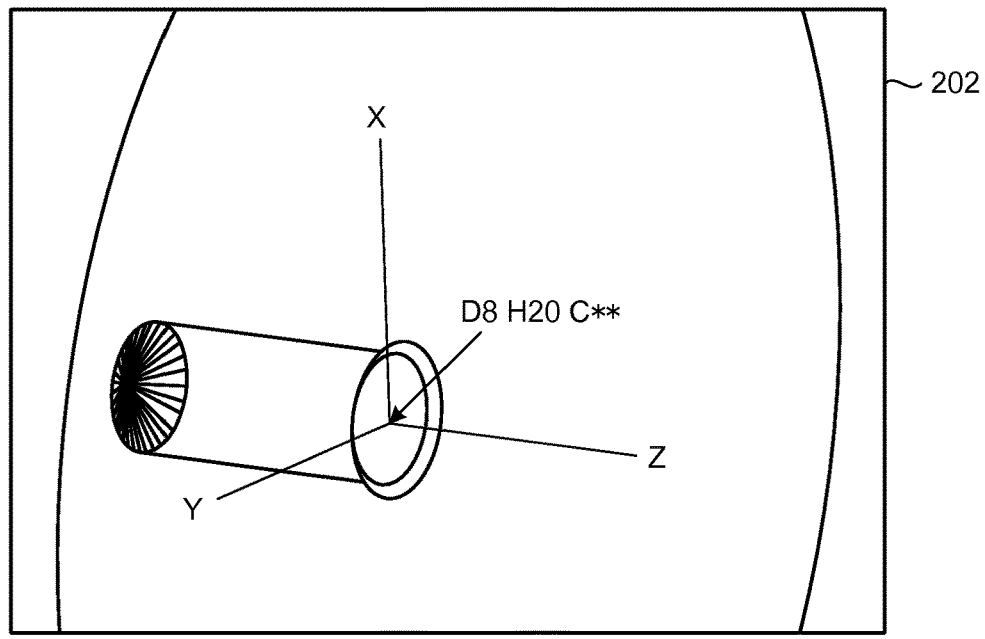
FIG. 39 is a diagram showing a display example of the shape display screen displayed when a "hole depth" item is set from a state shown in FIG. 38.

FIG. 39 is a diagram showing a display example of the shape display screen 202 displayed when a "hole depth" item is set from the state shown in FIG. 38. When the "hole depth" item is set, a 3D machining shape is displayed in which the length in the axial direction of the hole is changed according to a set hole depth.

Figure 40:
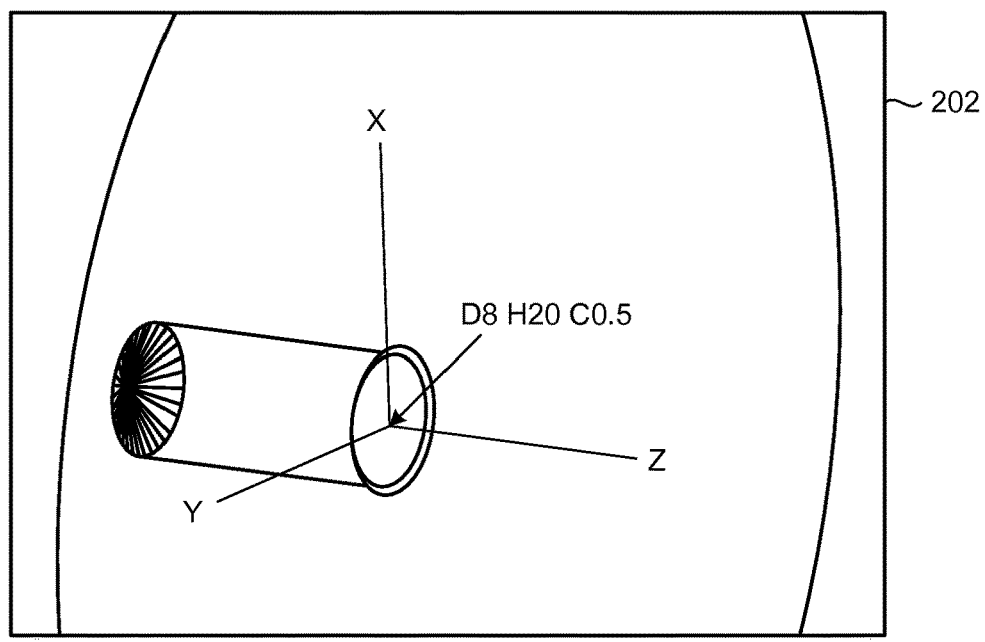
FIG. 40 is a diagram showing a display example of the shape display screen displayed when a "chamfering" item is set from a state shown in FIG. 39.

FIG. 40 is a diagram showing a display example of the shape display screen 202 displayed when a "chamfering" item is set from the state shown in FIG. 39. When the "chamfering" item is set, a 3D machining shape is displayed in which the 3D machining shape is changed such that the length of a portion where chamfering is executed is length set in the "chamfering" item.

Note that the 3D shapes shown in FIG. 32 to FIG. 40 are generated by the 3D-machining-shape generating unit 7.

When a unit of machining requiring setting of a track of a tool in shape instruction data is created anew, the display-screen control unit 11 displays a track of a tool on the shape display screen 202. A display object indicating the track of the tool is generated by the 2D-shape generating unit 12.

Figure 41:
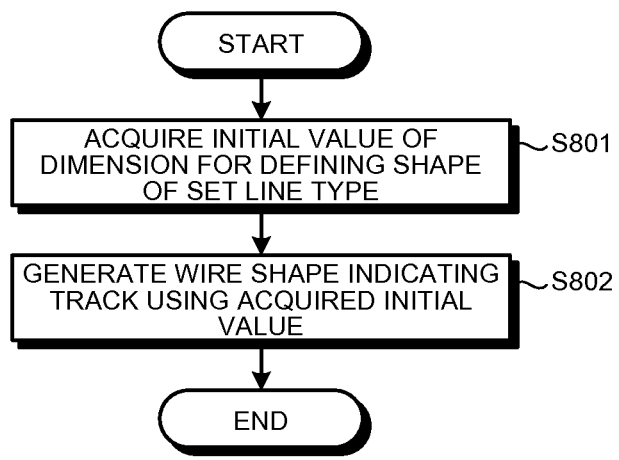
FIG. 41 is a flowchart for explaining the operation of a 2D-shape generating unit.

FIG. 41 is a flowchart for explaining the operation of the 2D-shape generating unit 12. When the operator sets, in a "shape" item, a line type for defining an element of the track of the tool, the 2D-shape generating unit 12 acquires initial values of dimensions for defining a shape of the set line type (step S801). For example, the initial values of the dimensions are set in advance for each of line types. Subsequently, the 2D-shape generating unit 12 generates, on the basis of the acquired initial values of the dimensions, a wire shape indicating the track (step S802). Note that the attribute processing unit 10 generates dimension data including position information on the basis of the wire shape generated by the 2D-shape generating unit 12. The display-screen control unit 11 displays the wire shape generated by the 2D-shape generating unit 12 on the shape display screen 202 together with dimension data.

Figure 42:
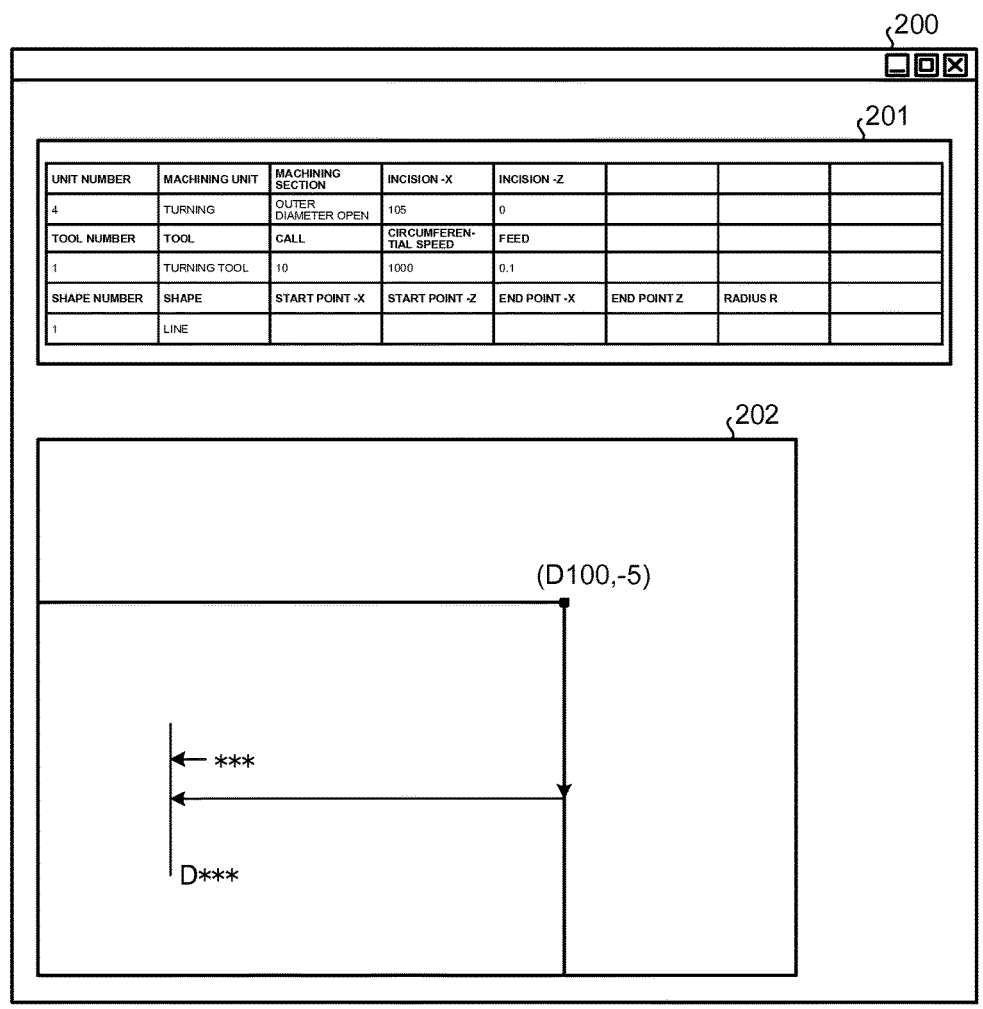
FIG. 42 is a diagram showing a display screen displayed when a "line" is set to a "shape" item when a unit of turning is created anew.

FIG. 42 is a diagram showing the display screen 200 displayed when a "line" is set in a "shape" item when a unit of turning is created anew. The "line" has been set in the "shape" item in a state in which turning instruction data and tool instruction data are already set. In this case, a wire shape displayed on the shape display screen 202 is formed by an arrow indicating a track having a start point at an incision point set in an "incision-X" item and an "incision-Z" item and having an end point in a position moved from the start point in a −X-axis direction by an initial value and an arrow indicating a track having a start point of the next track at the end point of the arrow and having an end point in a position moved from the start point of the next track in the +Z-axis direction by the initial value. A "start point-X" item, a "start point-Z" item, an "end point-X" item, and an "end point-Z" item are not set. Therefore, "D*" and "*" are displayed as text information of dimension data. Note that a prefix "D" included in the text information means a diameter.

Figure 43:
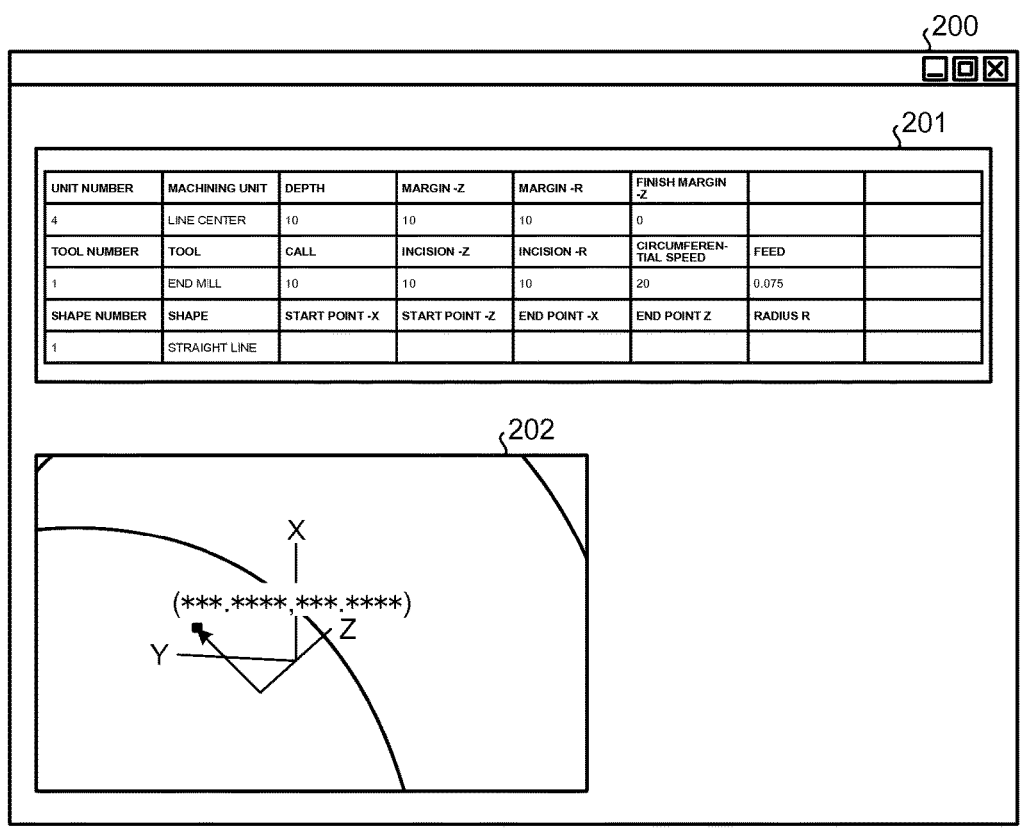
FIG. 43 is a diagram showing a display screen displayed when a "straight line" is set to the "shape" item when a unit of line center machining is created anew.

FIG. 43 is a diagram showing the display screen 200 displayed when a "straight line" is set in a "shape" item when a line center machining unit is created anew. As explained above, the "straight line" is set in the "shape" item in a state in which line machining instruction data and tool instruction data are already set. In this case, a wire shape of a straight line shape having lengths of initial values respectively in a +X-axis direction and a +Y-axis direction from the work coordinate origin is displayed on the shape display screen 202. A "start point-X" item, a "start point-Z" item, an "end point-X" item, and an "end point-Z" item are not set. Therefore, "D*" and "*" are displayed as text information of dimension data.

As explained above, according to the embodiment of the present invention, the NC-program editing apparatus 100 includes the 3D-machining-shape generating unit 7 that generates a 3D machining shape including position information in a three-dimensional virtual space on the basis of dimension data described for each unit of machining configuring the NC program, the attribute processing unit 10 that extracts the dimension data from the NC program and sets, in the extracted dimension data, three-dimensional position information corresponding to the 3D machining shape corresponding to the dimension data, and the display-screen control unit 11 that displays the NC program on the program display screen 201 and displays a projection drawing of the 3D machining shape on the shape display screen 202 and, when receiving an input for editing the NC program via the program display screen 201, reflects input content on the original NC program. The display-screen control unit 11 displays the extracted dimension data in a position corresponding to the position information set in the dimension data on the shape display screen 202. In this way, according to the embodiment of the present invention, the NC-program editing apparatus 100 can stereoscopically display a machining shape for each unit of machining and display dimension information or position information in a corresponding position on the stereoscopically displayed machining shape. Therefore, the operator can easily check the NC program.

When the display-screen control unit 11 receives, via the shape display screen 202, an input for selecting any arbitrary text information being displayed on the shape display screen 202, the display-screen control unit 11 moves the cursor to a place where dimension data described in the selected text information in the NC program being displayed on the program display screen 201 is described. Consequently, it is possible to reduce the number of inputs by the operator when the operator edits the NC program.

When the display-screen control unit 11 receives an input for selecting any item on the program display screen 201, the display-screen control unit 11 highlights text information corresponding to the selected item in text information being displayed on the shape display screen 202. Consequently, it is possible to allow the operator to easily understand an editing place.

When plural kinds of text information overlap with one another on the shape display screen 202, the display-screen control unit 11 can display only one of the plural kinds of text information displayed in a manner overlapped with one another. Consequently, it is possible to improve visibility of dimension data. Note that, for example, priority degrees can be set in advance for each of items. The display-screen control unit 11 can be configured to display text information related to an item, for which the highest priority degree is set, among the plural kinds of text information displayed in a manner overlapped with one another.

The attribute processing unit 10 generates work coordinate information describing, for each of machining shapes, a work coordinate origin and directions of axes included in a work coordinate system. The display-screen control unit 11 displays a coordinate object on the shape display screen 202 on the basis of the work coordinate information. Consequently, it is made possible to assist understanding of the work coordinate system by the operator.

The display-screen control unit 11 displays the shape of a track of a tool using an arrow directed from a start point to an end point. Consequently, the operator can easily understand distinction of the start point and the end point.

When extracted dimension data is not set, the attribute processing unit 10 associates position information of a predetermined initial value with the not-set dimension data. The display-screen control unit 11 displays the not-set dimension data in a position corresponding to the position information of the initial value associated with the not-set dimension data in a form indicating that the dimension data is not set. Consequently, the operator can easily understand what kind of item a not-set item is.

The CAD-data input unit 9 receives an input of CAD data. The display-screen control unit 11 displays the CAD data, a 3D machining shape, and dimension data to overlap with one another. Consequently, the operator can edit a program while comparing the CAD data and the NC program and easily check the program.

INDUSTRIAL APPLICABILITY

As explained above, the numerical-control-program editing apparatus, the numerical-control-program editing method, and the program according to the present invention are suitably applied to a numerical-control-program editing apparatus, a numerical-control-program editing method, and a program for performing editing of an NC program for numerically controlling a machine tool

REFERENCE SIGNS LIST

1 Interactive-operation processing unit
2 Display unit
3 Instruction input unit
4 Program editing unit
5 Program input unit
6 Program storing unit
7 3D-machining-shape generating unit
8 3D-finished-shape generating unit
9 CAD-data input unit
10 Attribute processing unit
11 Display-screen control unit
12 2D-shape generating unit
13 Program output unit
20, 40 NC programs
30 CAD data
100 NC-program editing apparatus
200 Display screen
201 Program display screen
202 Shape display screen
300 to 304, 400 Shapes
501 to 508, 510 to 514 Text information
509 Arrow
515 Coordinate object
600 Mouse cursor
601 Display region

The invention claimed is:

1. A numerical-control-program editing apparatus comprising:
a machining-shape generating unit that generates, for each unit of machining, a three-dimensional machining shape including position information in a three-dimensional virtual space based on attribute information, which is dimension information or position information described for each unit of machining configuring a numerical control (NC) program;
an attribute processing unit that extracts the attribute information from the NC program and associates three-dimensional position information corresponding to a machining shape corresponding to the extracted attribute information with the extracted attribute information; and
a display-screen control unit that displays the NC program on a program display screen and displays, on a shape display screen, a projection drawing in which the machining shape arranged in the virtual space is obliquely projected according to the position information contained in the machining shape, and when receiving an input for editing the NC program via the program display screen, reflects content of the input on the NC program, wherein
the display-screen control unit displays the extracted attribute information in a position indicated by position information associated with the attribute information on the shape display screen, the position being on the projection drawing and adjacent to a portion of the machining shape corresponding to the extracted attribute information,
when plural kinds of attribute information are displayed in a manner overlapped with one another on the shape display screen, the display-screen control unit displays only one of the plural kinds of attribute information displayed in the manner overlapped with one another,
the unit of machining configuring the NC program includes a plurality of items in which the attribute information is described,
priority degrees are set in advance for each of the items, and
the display-screen control unit displays attribute information related to an item for which a highest priority degree is set among the plural kinds of attribute information displayed in the manner overlapped with one another.

2. The numerical-control-program editing apparatus according to claim 1, wherein, when receiving, on the shape display screen, an input for selecting attribute information being displayed on the shape display screen, the display-screen control unit moves a cursor to a place in which the selected attribute information is described in the NC program being displayed on the program display screen.

3. The numerical-control-program editing apparatus according to claim 1, wherein, when receiving, on the program display screen, an input for selecting attribute information being displayed on the program display screen, the display-screen control unit highlights the selected attribute information in the attribute information being displayed on the shape display screen.

4. The numerical-control-program editing apparatus according to claim 1, wherein
the attribute processing unit generates, based on the NC program, work coordinate information describing, for each of machining shapes, a work coordinate origin and directions of axes included in a work coordinate system, and
the display-screen control unit displays, based on the work coordinate information, on the shape display screen, a work coordinate object indicating the work coordinate origin and the directions of the axes included in the work coordinate system.

5. The numerical-control-program editing apparatus according to claim 1, further comprising a finished-shape generating unit that generates a three-dimensional finished shape including the position information in the virtual space based on the machining shape, wherein
the display-screen control unit displays, on the shape display screen, a projection drawing in which the finished shape arranged in the virtual space is obliquely projected according to the position information contained in the finished shape.

6. The numerical-control-program editing apparatus according to claim 1, wherein,
the attribute processing unit associates a part representing an item in which the attribute information of the three-dimensional machining shape is set, with position information of the extracted attribute information.

7. A numerical-control-program editing apparatus comprising:
a machining-shape generating unit that generates, for each unit of machining, a three-dimensional machining shape including position information in a three-dimensional virtual space based on attribute information, which is dimension information or position information described for each unit of machining configuring a numerical control (NC) program;
an attribute processing unit that extracts the attribute information from the NC program and associates three-dimensional position information corresponding to a machining shape corresponding to the extracted attribute information with the extracted attribute information; and
a display-screen control unit that displays the NC program on a program display screen and displays, on a shape display screen, a projection drawing in which the machining shape arranged in the virtual space is obliquely projected according to the position information contained in the machining shape, and when receiving an input for editing the NC program via the program display screen, reflects content of the input on the NC program, wherein
the display-screen control unit displays the extracted attribute information in a position indicated by position information associated with the attribute information on the shape display screen, the position being on the projection drawing and adjacent to a portion of the machining shape corresponding to the extracted attribute information,
the machining unit configuring the NC program includes a unit of machining in which position information of a start point and an end point of a track of a tool is described as attribute information, and
the display-screen control unit displays, on the shape display screen, a shape of the track of the tool using an arrow directed from the start point to the end point.

8. A numerical-control-program editing apparatus comprising:
a machining-shape generating unit that generates, for each unit of machining, a three-dimensional machining shape including position information in a three-dimensional virtual space based on attribute information, which is dimension information or position information described for each unit of machining configuring a numerical control (NC) program;

an attribute processing unit that extracts the attribute information from the NC program and associates three-dimensional position information corresponding to a machining shape corresponding to the extracted attribute information with the extracted attribute information; and a display-screen control unit that displays the NC program on a program display screen and displays, on a shape display screen, a projection drawing in which the machining shape arranged in the virtual space is obliquely projected according to the position information contained in the machining shape, and when receiving an input for editing the NC program via the program display screen, reflects content of the input on the NC program, wherein the display-screen control unit displays the extracted attribute information in a position indicated by position information associated with the attribute information on the shape display screen, the position being on the projection drawing and adjacent to a portion of the machining shape corresponding to the extracted attribute information, when the extracted attribute information is not set, the attribute processing unit associates position information of a predetermined initial value with the not-set attribute information, and the display-screen control unit displays the extracted not-set attribute information in a position corresponding to the position information of the initial value associated with the not-set attribute information in a form indicating that the attribute information is not set.

9. A numerical-control-program editing method comprising:

generating, by a computer, for each unit of machining, a three-dimensional machining shape including position information in a three-dimensional virtual space based on attribute information, which is dimension information or position information described for each unit of machining configuring a numerical control (NC) program;

executing, by the computer, the attribute information from the NC program and associating three-dimensional position information corresponding to a machining shape corresponding to the extracted attribute information with the extracted attribute information;

displaying, by the computer, the NC program on a program display screen and displaying, on a shape display screen, a projection drawing in which the machining shape arranged in the virtual space is obliquely projected according to the position information contained in the machining shape;

displaying, by the computer, the extracted attribute information in a position indicated by position information associated with the attribute information on the shape display screen; and reflecting, by the computer, when receiving an input for editing the NC program via the program display screen, content of the input on the NC program, wherein the position is on the projection drawing and adjacent to a portion of the machining shape corresponding to the extracted attribute information, the machining unit configuring the NC program includes a unit of machining in which position information of a start point and an end point of a track of a tool is described as attribute information, and the numerical-control-program editing method further comprises displaying, by the computer, on the shape display screen, a shape of the track of the tool using an arrow directed from the start point to the end point.

10. The numerical-control-program editing method according to claim 9 further comprising, associating, by the computer, a part representing an item in which the attribute information of the three-dimensional machining shape is set, with position information of the extracted attribute information.

11. A non-transitory computer-readable recording medium that stores therein a complete program that causes a computer to execute:

a function generating, for each unit of machining, a three-dimensional machining shape including position information in a three-dimensional virtual space based on attribute information, which is dimension information or position information described for each unit of machining configuring a numerical control (NC) program;

a function of executing the attribute information from the NC program and associating three-dimensional position information corresponding to a machining shape corresponding to the extracted attribute information with the extracted attribute information;

a function of displaying the NC program on a program display screen and displaying, on a shape display screen, a projection drawing in which the machining shape arranged in the virtual space is obliquely projected according to the position information of the machining shape;

a function of displaying the extracted attribute information in a position indicated by position information associated with the attribute information on the shape display screen; and a function of reflecting, when receiving an input for editing the NC program via the program display screen, content of the input on the NC program, wherein the position is on the projection drawing and adjacent to a portion of the machining shape corresponding to the extracted attribute information, the machining unit configuring the NC program includes a unit of machining in which position information of a start point and an end point of a track of a tool is described as attribute information, and the complete program further causes the computer to execute a function of displaying, on the shape display screen, a shape of the track of the tool using an arrow directed from the start point to the end point.

12. The non-transitory computer-readable recording medium according to claim 11, wherein, the complete program causes the computer to execute a function of associating a part representing an item in which the attribute information of the three-dimensional machining shape is set, with position information of the extracted attribute information.

* * * * *